United States Patent
Park et al.

(10) Patent No.: US 6,865,177 B1
(45) Date of Patent: Mar. 8, 2005

(54) APPARATUS AND METHOD FOR GENERATING FRAME SYNC WORD AND VERIFYING THE FRAME SYNC WORD IN W-CDMA COMMUNICATION SYSTEM

(75) Inventors: Jin-Soo Park, Seoul (KR); Ho-Kyu Choi, Seoul (KR); Jae-Yoel Kim, Seoul (KR); Hee-Won Kang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/570,661

(22) Filed: May 15, 2000

(30) Foreign Application Priority Data

May 15, 1999 (KR) ........................................ 1999-17510

(51) Int. Cl.⁷ ................................................ H04J 3/06
(52) U.S. Cl. ...................... 370/350; 370/514; 375/145; 375/365
(58) Field of Search ................................. 370/335, 342, 370/350, 503, 509, 514, 516, 479; 375/135, 140, 145, 149, 371, 130, 146, 363–368

(56) References Cited

U.S. PATENT DOCUMENTS

| | | | | |
|---|---|---|---|---|
| 5,260,967 A | * | 11/1993 | Schilling | 370/342 |
| 5,689,526 A | * | 11/1997 | Slonneger et al. | 375/145 |
| 5,802,107 A | * | 9/1998 | Willming | 375/265 |
| 5,883,929 A | | 3/1999 | Wang et al. | 375/367 |
| 5,982,807 A | * | 11/1999 | Snell | 375/146 |
| 6,069,915 A | * | 5/2000 | Hulbert | 375/150 |
| 6,154,457 A | * | 11/2000 | Vayrynen | 370/350 |
| 6,163,566 A | * | 12/2000 | Shiino | 375/143 |
| 6,188,714 B1 | * | 2/2001 | Yamaguchi | 375/130 |
| 6,226,337 B1 | * | 5/2001 | Klank et al. | 375/367 |
| 6,246,697 B1 | * | 6/2001 | Whinnett et al. | 370/479 |
| 6,351,498 B1 | * | 2/2002 | Yamao et al. | 375/260 |
| 6,385,181 B1 | * | 5/2002 | Tsutsui et al. | 370/335 |
| 6,539,047 B1 | * | 3/2003 | Moon | 375/135 |
| 6,542,478 B1 | * | 4/2003 | Park | 370/308 |

FOREIGN PATENT DOCUMENTS

JP          2-349703          12/2000

OTHER PUBLICATIONS

Japanese Office Action dated Feb. 3, 2004 issued in a counterpart application, namely, Appln. No. 2000-619141.

* cited by examiner

*Primary Examiner*—Alpus H. Hsu
(74) *Attorney, Agent, or Firm*—Dilworth & Barrese LLP

(57) ABSTRACT

There is provided an apparatus and method for generating a frame sync word and verifying the frame sync word in an asynchronous CDMA communication system. In the apparatus for generating a sync word for synchronization of frames each having a predetermined number of slots, each of at least two m-sequence generators generates the predetermined number of sequential elements, and a selector multiplexes the sequential elements received from the m-sequence generators and assigns the multiplexed elements in the slots.

19 Claims, 28 Drawing Sheets

911.1021

SYNCHRONIZED FRAMES

ASYNCHRONIZED FRAMES

FIG. 3A
5 BIT UPLINK DPCCH PILOT
FIG. 3B
6 BIT UPLINK DPCCH PILOT
FIG. 3C
7 BIT UPLINK DPCCH PILOT
FIG. 3D
8 BIT UPLINK DPCCH PILOT
 SYNC BIT
 TYPICAL PILOT BIT 4 BIT DOWNLINK DPCH PILOT
FIG. 3E
4 BIT DOWNLINK DPCH PILOT(DIVERSITY ANTENNA)
FIG. 3F
8 BIT DOWNLINK DPCH PILOT, DOWNLINK PCCPCH PILOT, OR DOWNLINK SCCPCH PILOT
FIG. 3G
16 BIT DOWNLINK DPCH PILOT OR DOWNLINK SCCPCH PILOT
FIG. 3H
 SYNC BIT
 TYPICAL PILOT BIT

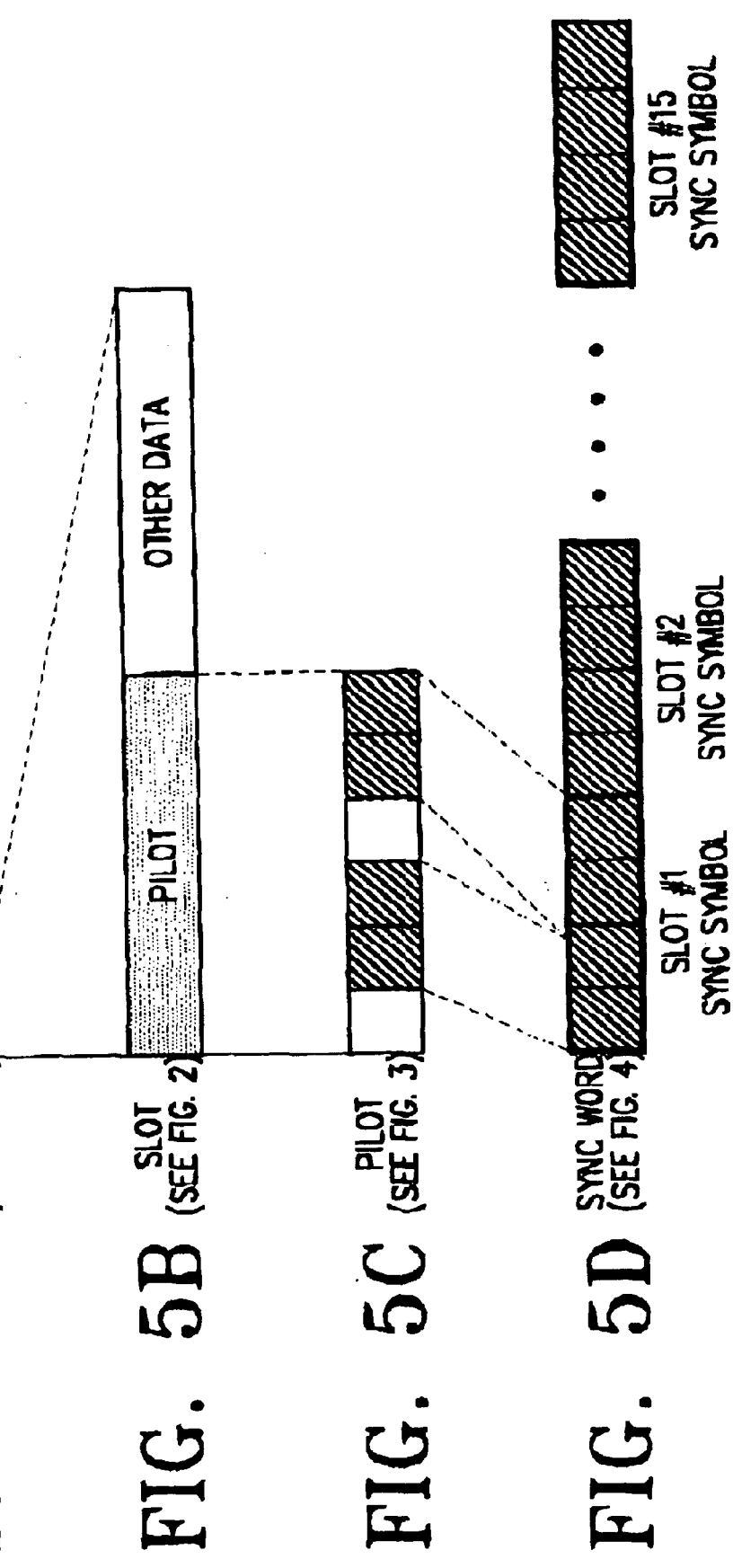

APPARATUS AND METHOD FOR GENERATING FRAME SYNC WORD AND VERIFYING THE FRAME SYNC WORD IN W-CDMA COMMUNICATION SYSTEM

BACKGROUND OF THE INVENTION

1. Field of the Invention

The present invention relates generally to an apparatus and method for generating a frame sync word and verifying the frame sync word in a CDMA (Code Division Multiple Access) communication system, and in particular, to an apparatus and method for generating a frame sync word and verifying the frame sync word in an asynchronous CDMA (W-CDMA) communication system.

2. Description of the Related Art

As the third-generation mobile communication is under standardization, efforts are expended toward the integration of mobile communication systems around the world.

Especially, harmonization of the North America CDMA 2000 and the European W-CDMA is accelerated. In the course, the probability is increased that a chip rate of 3.84 Mcps will be used commonly in a W-CDMA communication system and asynchronous CDMA (referred to as CDMA 2000, hereinafter) communication system which have used their different chip rates of 3.6864 Mcps. Therefore, the W-CDMA system should be reconfigured in such a way that it can operate at a chip rate reduced to a 15/16 (3.84 cps/4.096 cps) of the original chip rate of 4.096 Mcps. The best way of redesigning the conventional W-CDMA system without any modification to its slot structure is to reduce 16 slots per frame to 15 slots per frame.

The change in the number of slots per frame for harmonization between CDMA 2000 and W-CDMA is accompanied by a design modification to a pilot sync word pattern for use in frame synchronization verification.

The W-CDMA radio communication standards under development in the 3GPP (3$^{rd}$ Generation Partnership Project) as of May 1999, one of conventional W-CDMA communication system technologies, involves frame synchronization verification using a sync word. The sync word in the conventional technology is designed on the assumption that one frame has 16 slots. Now, a new sync word fit for a 15 slots per frame structure is under development. As one frame has 15 slots, a frame sync word generating apparatus should be redesigned in the W-CDMA communication system. With the new frame structure, a conventional synchronization verification method based on the 16 slot-per-frame structure is not applicable to the W-CDMA system. Hence, a new synchronization verification method should be explored adaptively to the changed 15 slots-per-frame structure.

SUMMARY OF THE INVENTION

An object of the present invention is, therefore, to provide an apparatus and method for generating a sync word pattern to verify synchronization in a W-CDMA communication system.

Another object of the present invention is to provide an apparatus and method for generating a sync word pattern adapted to operate in a $2^P-1$ (P is a positive integer) slots per frame structure in a CDMA communication system.

A further object of the present invention is to provide an apparatus and method for verifying frame synchronization in a W-CDMA communication system with a 15 slots per frame structure.

Still another object of the present invention is to provide an apparatus and method for generating a frame sync word using m-sequences in a W-CDMA communication system with a 15 slots per frame structure.

Yet another object of the present invention is to provide an apparatus and method for verifying synchronization by detecting a sync word pattern from received pilot signals in a W-CDMA communication system where one frame has 15 slots and an m-sequence pilot signal is transmitted in each slot for synchronization verification.

These and other objects can be achieved by providing an apparatus for generating a sync word for synchronization of frames each having a predetermined number of slots. In the sync word generating apparatus, each of at least two m-sequence generators generates the predetermined number of sequential elements, and a selector multiplexes the sequential elements received from the m-sequence generators and assigns the multiplexed elements in the slots.

BRIEF DESCRIPTION OF THE DRAWINGS

The above and other objects, features and advantages of the present invention will become more apparent from the following detailed description when taken in conjunction with the accompanying drawings in which:

FIGS. 3A to 3H illustrate the pilot structure of each channel in the W-CDMA communication system;

FIGS. 5A to 5D illustrate a relationship among a frame, slots, pilots, and a sync word in connection with FIGS. 1 to 4C;

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail.

Verification of a sync word pattern and synchronization according to the feature of the present invention is applicable to a CDMA mobile communication system, especially a W-CDMA communication system. The present invention specifically relates to use of a sync word for synchronization verification. Here, the sync word is a bit sequence in a specific pattern known to both a transmitter and a receiver. Although the sync word pattern is usually predetermined and stored in the transmitter/receiver, it is generated during an actual operation and communicated between the transmitter and the receiver.

Figure 21A:
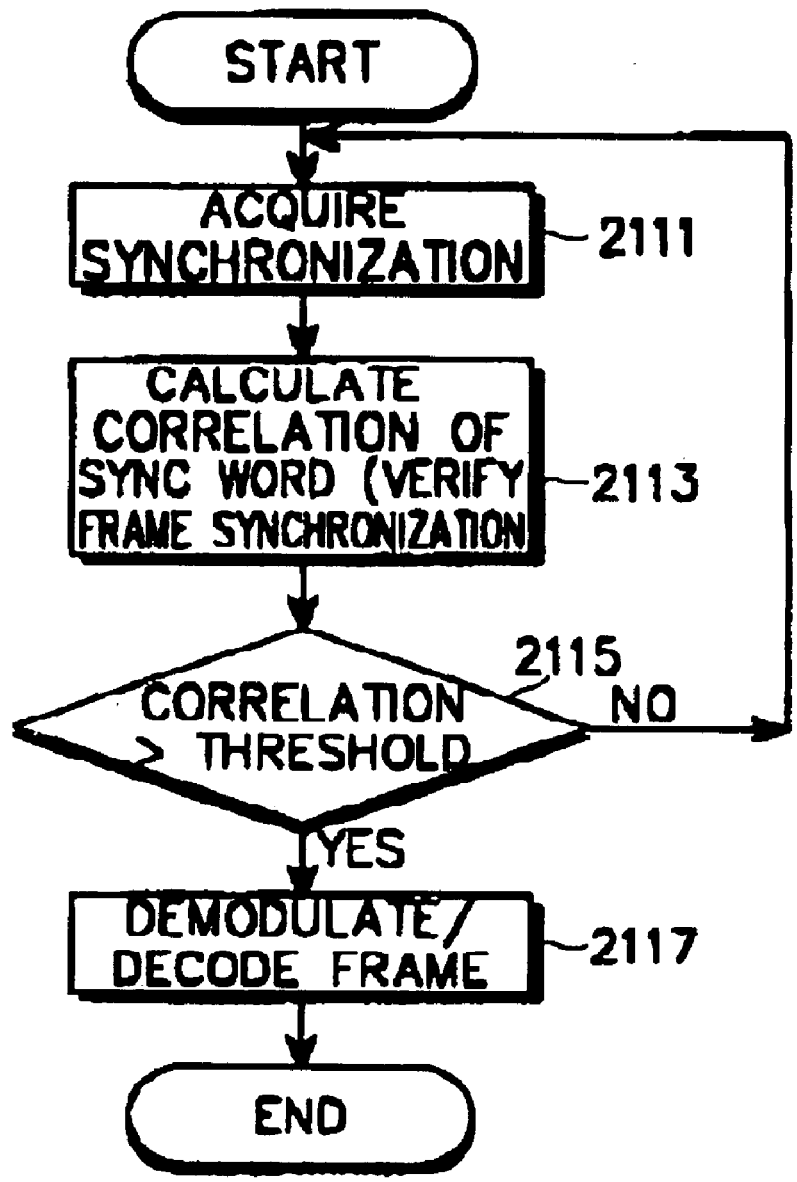
FIGS. 21A and 21B are flowcharts illustrating embodiments of a sync word verifying procedure.
Figure 21B:
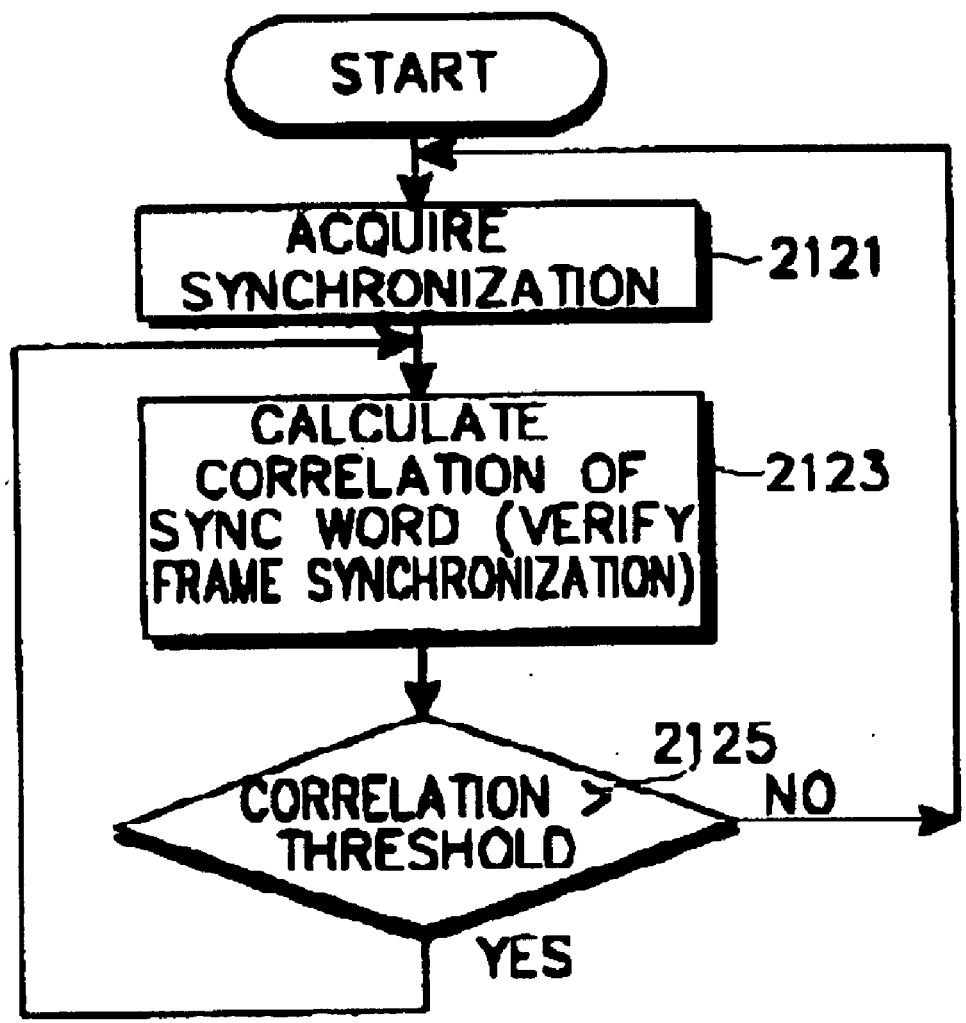

Synchronization is considered in three ways: PN chip synchronization, slot synchronization, and frame synchronization. A receiver operates in synchronization with a time provided by a signal transmitted by a transmitter in PN chip units, slot units, or frame units, respectively. An embodiment of the present invention provides an apparatus and method for generating a sync word for use in verification of frame (basic transmission unit) synchronization. The frame synchronization verification is performed after acquisition of PN chip, slot (frame segment), and frame synchronization. To do so, the transmitter transmits a sync word in the slots of a frame and the receiver calculates the correlation of an autonomously generated sync word to the received sync word to verify frame synchronization. If frames are not in synchronization, the synchronization acquisition process is repeated. Alternatively, if the frames are in synchronization, the synchronization verification operation ends as illustrated in FIG. 21A or is repeated for a resynchronization process as illustrated in FIG. 21B.

Figure 1A:
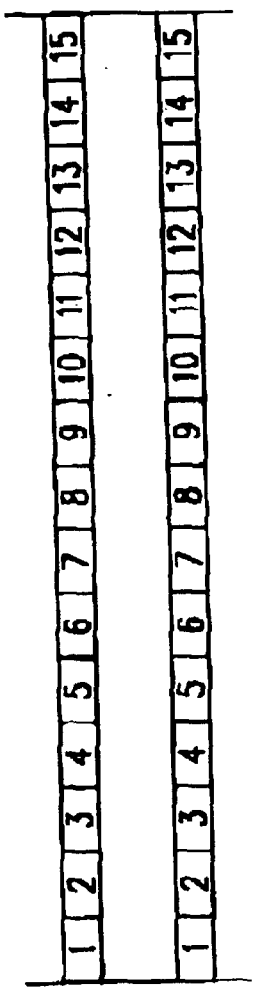
FIGS. 1A, 1B, and 1C are concept views of frame synchronization in a W-CDMA communication system.
Figure 1B:
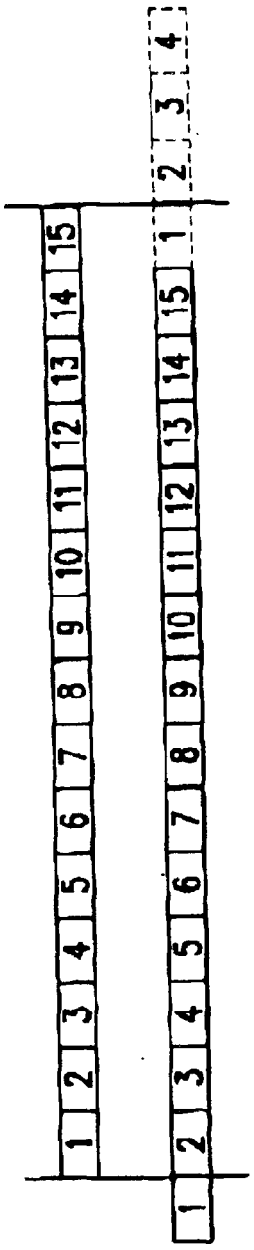
Figure 1C:
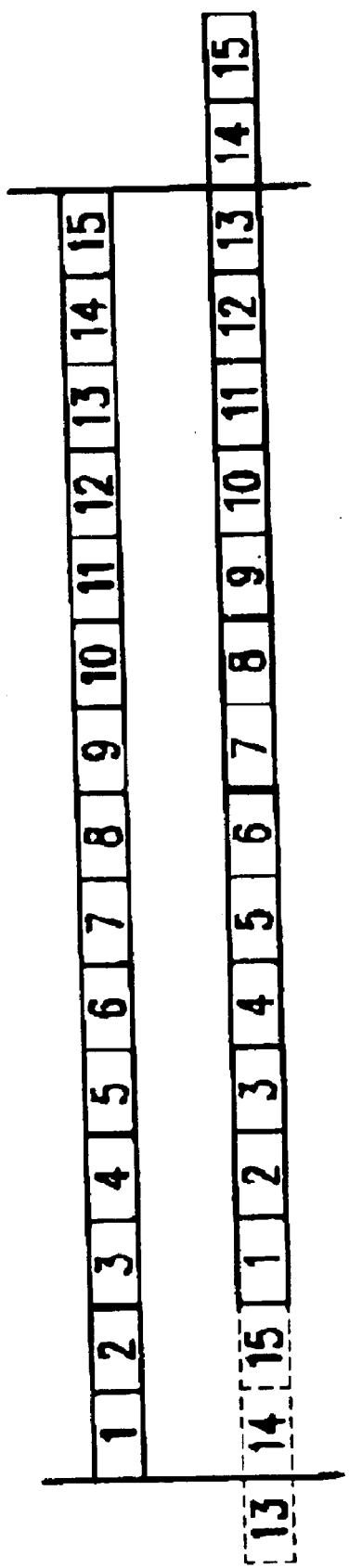

Now a description of frame synchronization will be given herein below. FIGS. 1A, 1B, and 1C are concept views of frame synchronization in a W-CDMA communication system. In the drawings, slots are numbered 1 to 15, implying that one frame has 15 slots.

Referring to FIGS. 1A, 1B, and 1C, each upper frame provides the actual frame time of a transmitted signal, and each lower frame is the frame time that a receiver has acquired. FIG. 1A illustrates the case that the actual frame time is equal to the acquired frame time and two frames are in synchronization. FIGS. 1B and 1C illustrate the cases where the actual frame time is different from the acquired frame time and the two frames are not in synchronization. Here, it is assumed that slots are synchronized even though frames are asynchronous, as shown in FIGS. 1B and 1C.

FIGS. 2A to 2D illustrate the position and bit number of a pilot in a slot of each channel according to the 3GPP W-CDMA radio standards which are under development. The pilot on each channel is an unmodulated spread signal which provides a basis for coherent demodulation, that is, is used for channel estimation.

Figure 2A:
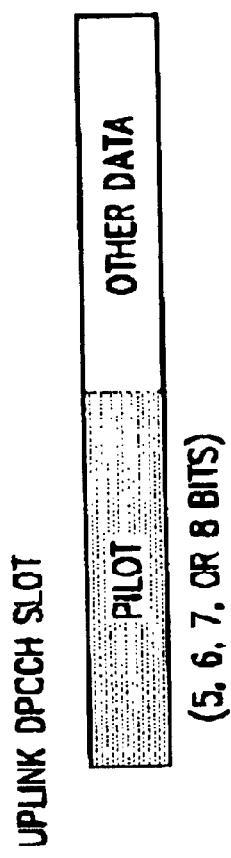
FIGS. 2A to 2D illustrate the slot structure of each channel in the W-CDMA communication system.
Figure 2B:
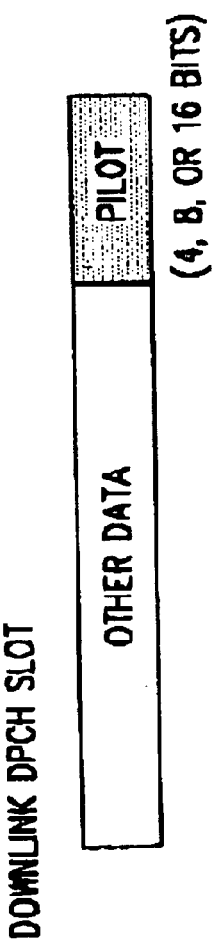
Figure 2C:
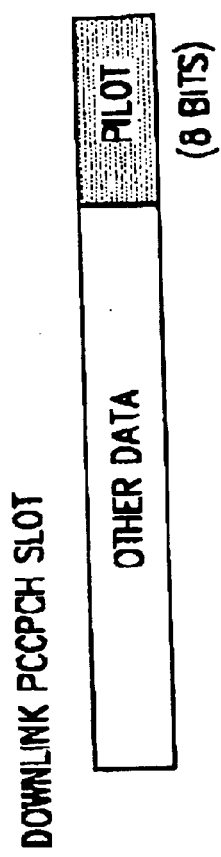
Figure 2D:
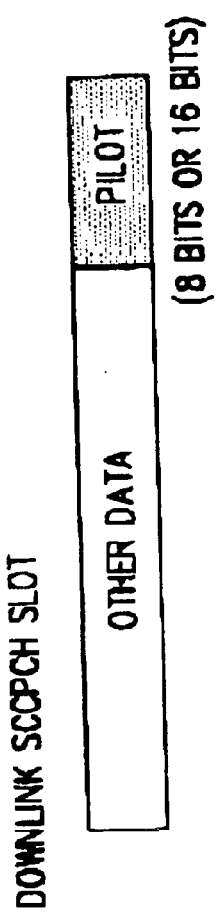

FIG. 2A illustrates the slot structure of an uplink dedicated physical control channel (DPCCH) with a 5- to 8-bit pilot in an earlier part of each slot. A pilot is in a latter part of each slot, occupying 4, 8, or 16 bits on a downlink dedicated physical control channel (DPCH) in FIG. 2B. FIG. 2C illustrates the slot structure of a downlink primary common control physical channel (PCCPCH). Here, the pilot is in a latter part of each slot, occupying 8 bits. On a downlink secondary common control physical channel (SCCPCH), the pilot is 8 or 16 bits in a latter part of each slot in FIG. 2D. The pilot bits position can be changed in a slot if the transmitter and receiver have known the position in advance.

Part of the pilot bits in the slot structures shown in FIGS. 2A to 2D can be used to form a part of sync word. The bits in a slot used to form a part of sync word are referred to as a sync symbol (sync bits). Sync bits in one slot form one sync symbol and the sync symbols of one frame form one sync word.

FIGS. 3A to 3H illustrate sync bits among pilot bits in a specific slot of each channel as provided by the 3GPP W-CDMA radio standards. Blank bits in FIGS. 3A to 3H are pilot bits having the same value in all slots, that is, bits other than sync bits. These pilot bits are referred to as typical pilot bits. Black-marked bits are sync bits having particular values in different slots for use in verifying frame synchronization. The pilot bits are all or partially used for channel estimation.

Figure 8:
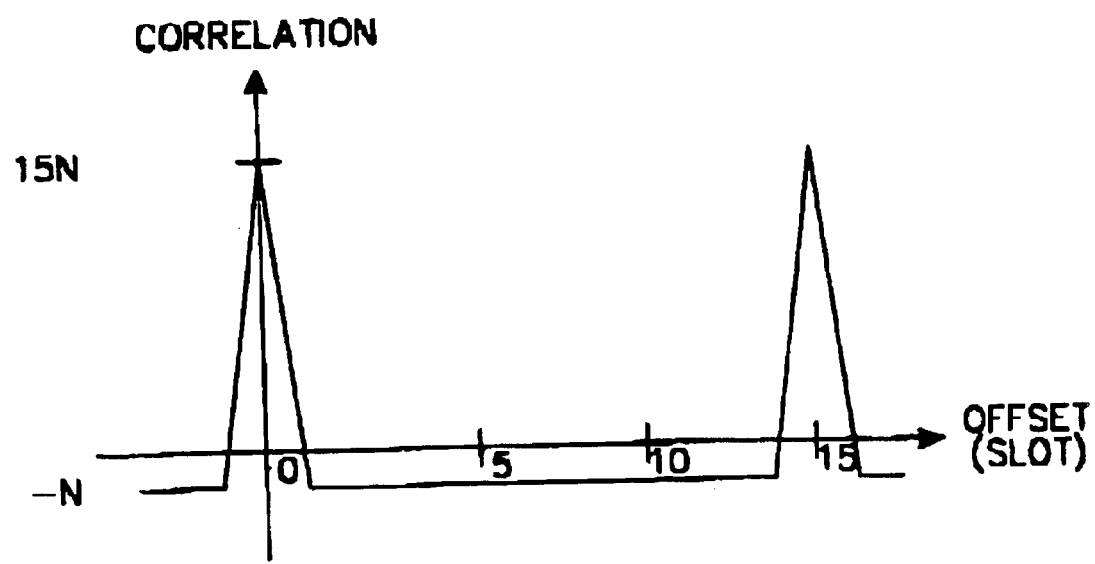
FIG. 8 is a graph showing a correlation characteristic of a sync word configured as shown in FIG. 6.

Four (4) pilot bits of a 5- to 8-bit pilot signal are used as sync bits in one slot of an uplink DPCCH as shown in FIGS. 3A to 3D. In FIGS. 3E and 3F, 2 of 4 pilot bits and 2 of 4 diversity bits in one slot of a downlink DPCH are used as sync bits. FIG. 3G illustrates an 8-bit pilot with 4 sync bits in one slot of a downlink DPCH, PCCPCH, or SCCPCH. In FIG. 3H, 8 of 16 pilot bits are used as sync bits in one slot of a downlink DPCH or SCCPCH.

The position and number of sync bits in a pilot are shown in FIGS. 2A to 2D and FIGS. 3A to 3H by way of example for the better understanding of the embodiment of the present invention. Therefore, it is obvious that other slot structures and bit arrangements can be contemplated within the scope and spirit of the present invention.

As described above, the embodiment of the present invention provides a generally applied sync word pattern and a method and apparatus for generating the sync word pattern in a W-CDMA communication system where one frame includes 15 or $2^P-1$ (P is a positive integer) slots. For clarity, the following description of an embodiment of the present invention is based on the assumption that one frame is comprised of 15 slots.

Figure 4A:
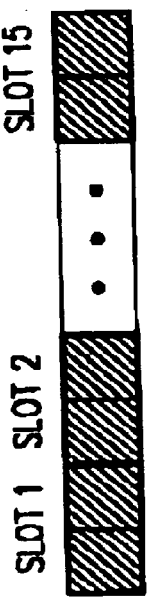
FIGS. 4A, 4B, and 4C illustrate sync word structures in the W-CDMA communication system.
Figure 4B:
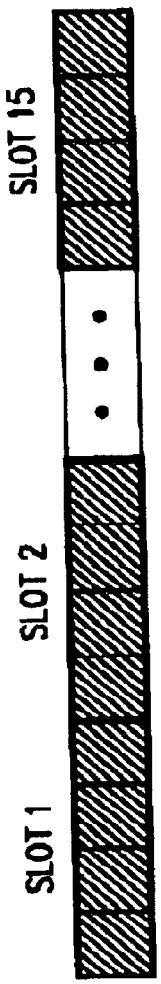
Figure 4C:
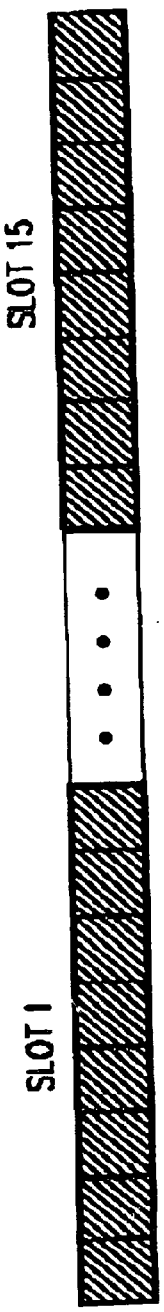

FIGS. 4A, 4B, and 4C illustrate different sync words formed out of sync bits in the slots of one frame.

In FIG. 4A, one sync symbol is 2 bits and one sync word includes 30 bits (=2×15). FIG. 4B illustrates a sync symbol of 4 bits and thus a sync word of 60 bits (=4×15). With 8-bit sync symbols, a sync word has 120 bits (=8×15) as shown in FIG. 4C. The sync words shown in FIGS. 4A, 4B, and 4C occur repeatedly in every frame.

FIGS. 5A to 5D illustrate a relationship among a frame, slots, pilots, and a sync word. Referring to FIGS. 5A to 5D, one frame has 15 slots (see FIG. 5A), one slot includes pilot data and other information data (TPC, TFCI) (see FIG. 5B), the pilot has sync bits and typical pilot bits (see FIG. 5C), and a sync word is formed out of the sync bits in one frame (see FIG. 5D).

Figure 6:
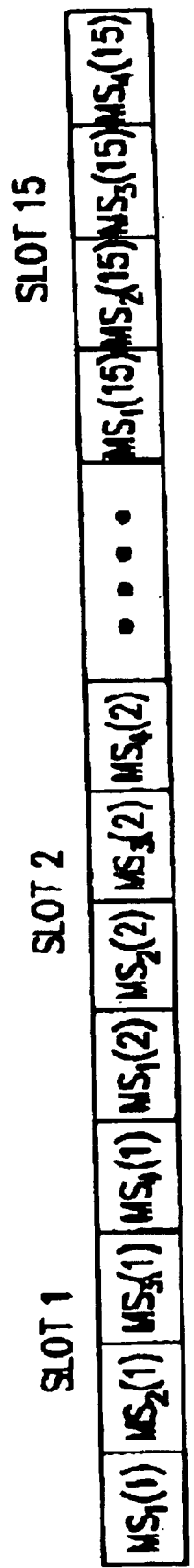
FIG. 6 illustrates the structure of a sync word used in a W-CDMA communication system according to an embodiment of the present invention.

FIG. 6 illustrates a sync word pattern for a 60-bit sync word according to an embodiment of the present invention.

Referring to FIG. 6, as an example, the number of bits of a sync symbol is N and the period of the sync word (sync word length) is 15N. If N is 4, the sync word length is 60 bits. To generate such a frame sync word as shown FIGS. 5A to 5D, N(4) m-sequences are needed in this embodiment of the present invention. If one frame includes 15 or $2^P-1$ slots, the number of slots per frame is equal to the m-sequence period. Therefore, the sync word is formed using m-sequences. The N(4) m-sequences may be generated from the same or different generator polynomials, and m-sequences which come from the same generator polynomial may have the same or different starting points.

If an $i^{th}$ element of an $n^{th}$ m-sequence among the N m-sequences is $MS_n(i)$, the sync symbols in 15 slots are listed as below.

TABLE 1 sync symbol in 1st slot: $MS_1(1), MS_2(1), \ldots, MS_N(1)$
sync symbol in 2nd slot: $MS_1(2), MS_2(2), \ldots, MS_N(2)$
sync symbol in 3rd slot: $MS_1(3), MS_2(3), \ldots, MS_N(3)$
sync symbol in 4th slot: $MS_1(4), MS_2(4), \ldots, MS_N(4)$
sync symbol in 5th slot: $MS_1(5), MS_2(5), \ldots, MS_N(5)$
sync symbol in 6th slot: $MS_1(6), MS_2(6), \ldots, MS_N(6)$
sync symbol in 7th slot: $MS_1(7), MS_2(7), \ldots, MS_N(7)$
sync symbol in 8th slot: $MS_1(8), MS_2(8), \ldots, MS_N(8)$
sync symbol in 9th slot: $MS_1(9), MS_2(9), \ldots, MS_N(9)$
sync symbol in 10th slot: $MS_1(10), MS_2(10), \ldots, MS_N(10)$
sync symbol in 11th slot: $MS_1(11), MS_2(11), \ldots, MS_N(11)$
sync symbol in 12th slot: $MS_1(12), MS_2(12), \ldots, MS_N(12)$
sync symbol in 13th slot: $MS_1(13), MS_2(13), \ldots, MS_N(13)$
sync symbol in 14th slot: $MS_1(14), MS_2(14), \ldots, MS_N(14)$
sync symbol in 15th slot: $MS_1(15), MS_2(15), \ldots, MS_N(15)$ For N=4 in FIG. 5, the sync word is

TABLE 2

$MS_1(1), MS_2(1), MS_3(1), MS_4(1)$
$MS_1(2), MS_2(2), MS_3(2), MS_4(2)$
$MS_1(3), MS_2(3), MS_3(3), MS_4(3)$
$MS_1(4), MS_2(4), MS_3(4), MS_4(4)$
$MS_1(5), MS_2(5), MS_3(5), MS_4(5)$
$MS_1(6), MS_2(6), MS_3(6), MS_4(6)$
$MS_1(7), MS_2(7), MS_3(7), MS_4(7)$
$MS_1(8), MS_2(8), MS_3(8), MS_4(8)$
$MS_1(9), MS_2(9), MS_3(9), MS_4(9)$
$MS_1(10), MS_2(10), MS_3(10), MS_4(10)$
$MS_1(11), MS_2(11), MS_3(11), MS_4(11)$
$MS_1(12), MS_2(12), MS_3(2), MS_4(12)$
$MS_1(13), MS_2(13), MS_3(3), MS_4(13)$
$MS_1(14), MS_2(14), MS_3(14), MS_4(14)$
$MS_1(15), MS_2(15), MS_3(15), MS_4(15)$

The above sync word is generated in one of two ways.

In the first approach, step 2 is repeated for slot number i=1 to 15 in step 1, step 3 is repeated for bit number n=1 to N in a slot in step 2, the sync bit $MS_n(i)$ is generated by use of an m-sequence generator in step 3, and the sync bit $MS_n(i)$ is output in step 4.

In the second approach, N m-sequences with length 15 are generated and step 2 is repeated for each frame in step 1, step 3 is repeated for slot number i=1 to 15 in step 2, step 4 is repeated for bit number n=1 to N in a slot in step 3, and the sync bit $MS_n(i)$ generated in step 3 is output in step 4.

Figure 7:
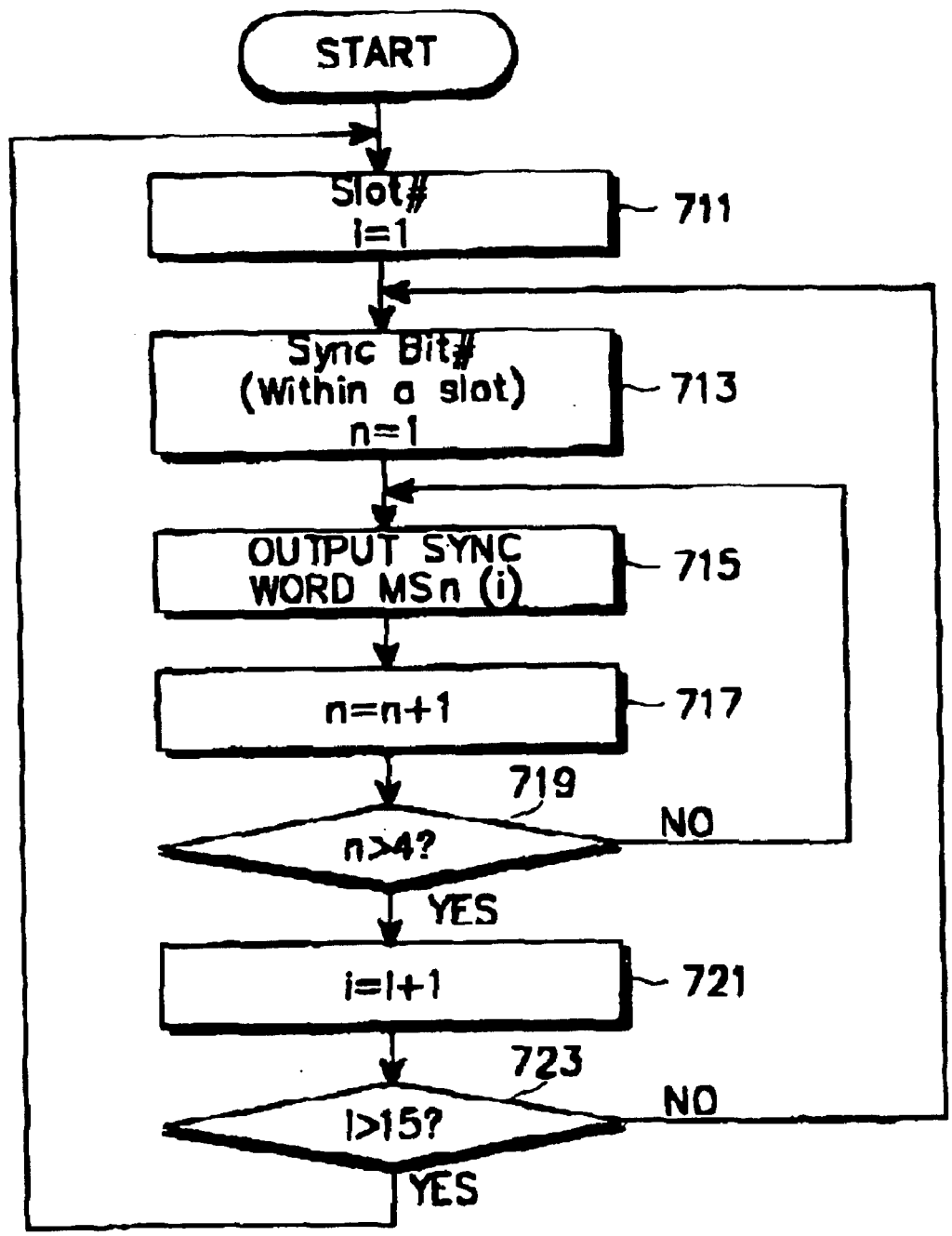
FIG. 7 is a flowchart illustrating a sync word generating procedure according to the embodiment of the present invention.

The sync word generation is expressed in a flowchart shown in FIG. 7.

Referring to FIG. 7, for generation of the sync word, slot index i is set to 1 in step 711 and sync index n in slot #1 is set to 1 in step 713. A sync bit $MS_n(i)$ is output from a m-sequence generator in step 715 and sync index n is incremented by 1 in step 717. If n is 4 or smaller, the procedure goes back to step 715. If n is larger than 4 in step 719, slot index i is incremented by 1 in step 721. If slot index i is larger than 15, slot index i is set to the initial value 1 back in step 711 and the above procedure is repeated. If slot index i is 15 or smaller, sync index n is set to the initial value 1 back in step 713 to generate sync bits in the next slot and the above procedure is repeated.

The sync word generated in the operation shown in FIG. 7 exhibits an auto-correlation characteristic as illustrated in FIG. 8 because of the nature of m-sequences.

Referring to FIG. 8, if frames are in synchronization, that is, a slot offset is 0 or a multiple of 15, the auto-correlation of the sync word is 15N. In the case of asynchronous frames, that is, a slot offset other than 0 or a multiple of 15, the auto-correlation of the sync word is −N. Accordingly, frame synchronization can be verified with high reliability by the use of the sync word generated in the above method.

Next, the structures and operations of a transmitting device and a receiving device for transmitting and receiving a sync word in a W-CDMA communication system according to the embodiment of the present invention will be described.

Figure 9:
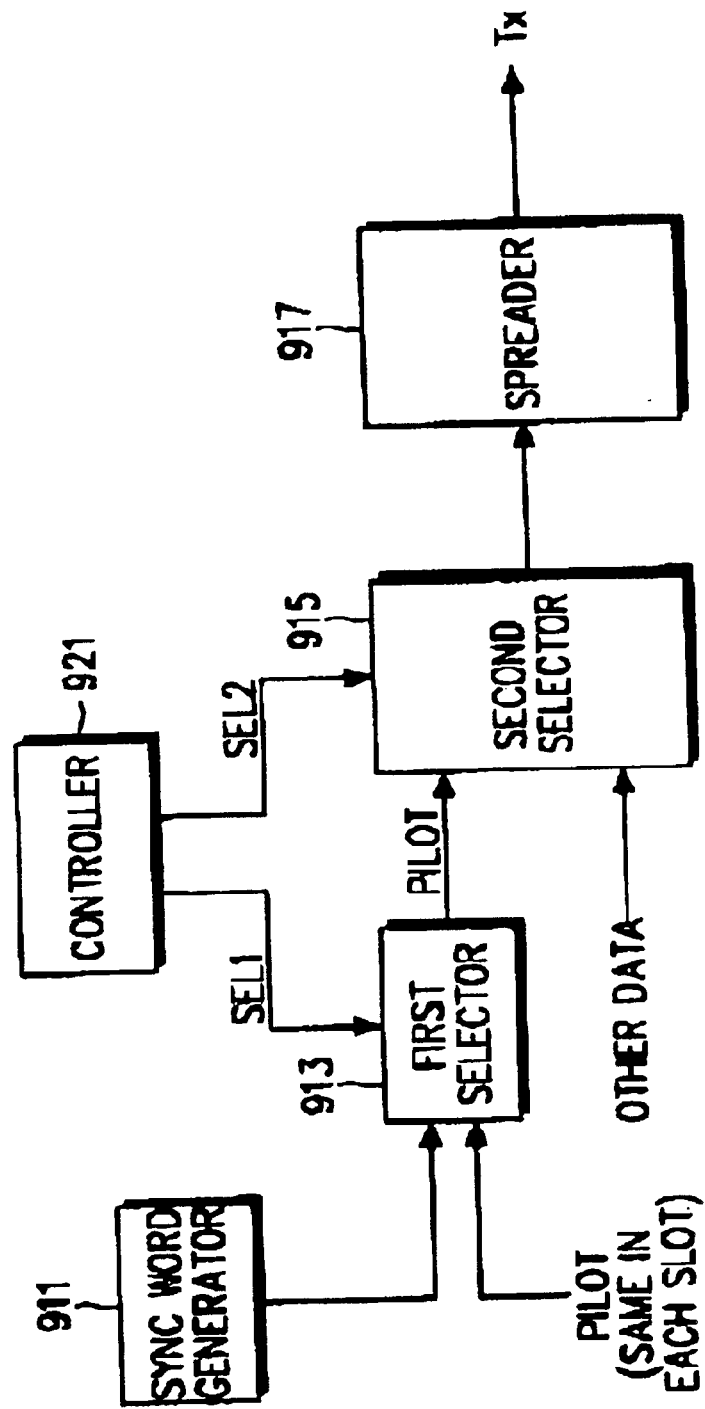
FIG. 9 is a block diagram of a transmitting device in the W-CDMA communication system according to the embodiment of the present invention.

FIG. 9 is a block diagram of a data channel transmitting device for generating a sync word and transmitting the sync word in a base station or a mobile station according to the embodiment of the present invention.

Referring to FIG. 9, a sync word generator 911, which will be described later in detail in connection with FIGS. 11, 12, and 13, outputs a sync symbol of N sync bits in each slot to generate a sync word, that is, a sync word with 15×N sync bits. A controller 921 generates a first select signal sel1 to select the sync bits received from the sync word generator 911 and typical pilot bits in a pilot period of each slot and a second select signal sel2 to select the pilot and other data (TPC, TFCI bits) in each slot. Since pilot periods are different on different uplink and downlink channels as shown in FIGS. 3A to 3H, the controller 921 generates the first select signal sel1 for selecting sync bits and typical pilot bits to be inserted into a pilot period in each slot of a corresponding channel according to a corresponding sync bit and typical pilot bit pattern shown in FIGS. 3A to 3H. The controller 921 generates the second select signal sel2 for selecting the position of the pilot information in each slot of the channel according to a corresponding pilot information location pattern shown in FIGS. 2A to 2D. The second select signal sel2 so required because the selected pilot information is inserted into a different position in a slot depending on uplink and downlink channels as shown in FIGS. 2A to 2D. A first selector 913 multiplexes the sync bits received from the sync word generator 911 and the typical pilot bits in response to the first select signal sel1 according to a corresponding pattern shown in FIGS. 3A to 3H. A second selector 915 multiplexes the pilot received from the first selector 913 and other data in response to the second select signal sel2 according to a corresponding pattern shown in FIGS. 2A to 2D. The first and second selectors 913 and 915 can be multiplexers. A spreader 917 spreads slot information received from the second selector 915.

A transmitting device in a Base Station (BS) further has a sync channel transmitter which is later described. Sync information is transmitted via primary and secondary sync channels (P-SCH and S-SCH) or only via the P_SCH. The sync channels will be described later with reference to FIGS. 16A to 18.

Figure 10:
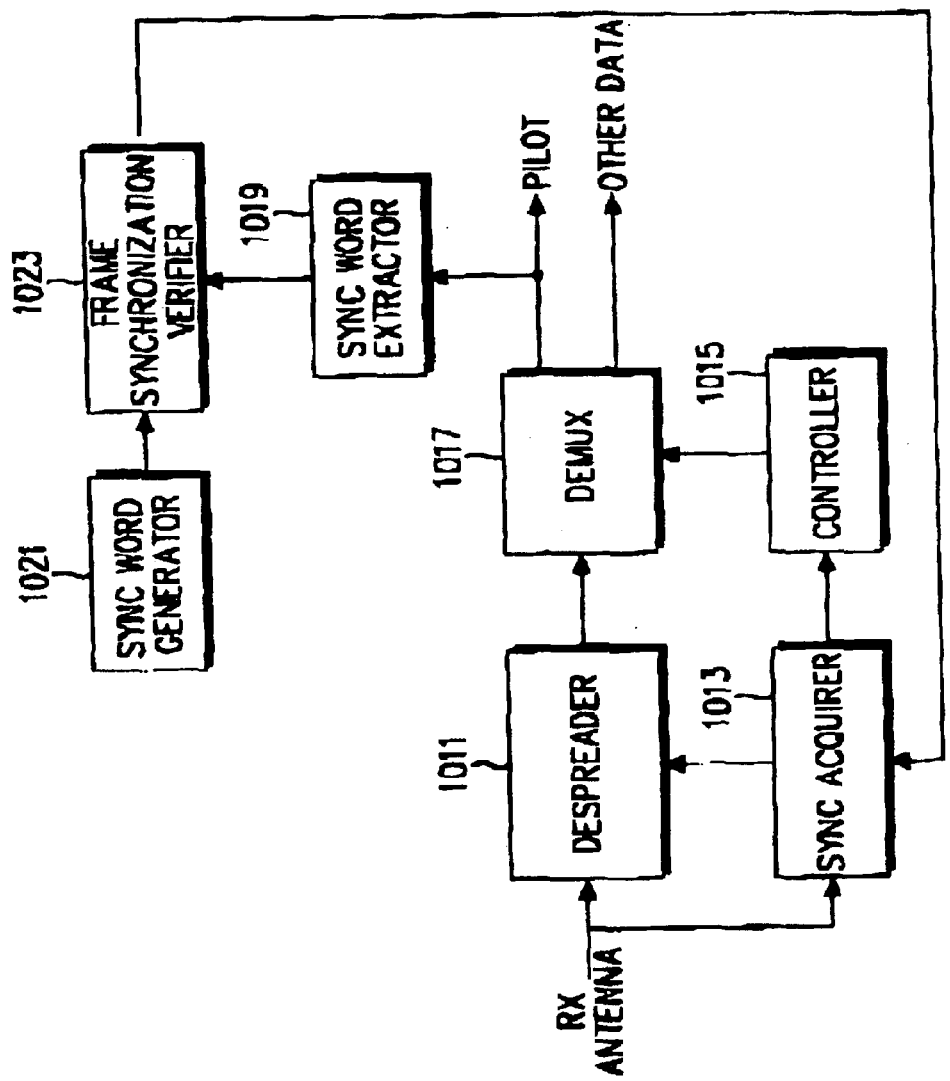
FIG. 10 is a block diagram of a receiving device in the W-CDMA communication system according to the embodiment of the present invention.

FIG. 10 is a block diagram of a receiving device for receiving sync words in a base station or a mobile station according to the embodiment of the present invention.

In FIG. 10, a sync acquirer 1013 acquires PN chip, slot, and frame synchronization from a received signal in two or three steps. The sync acquirer 1013 is disclosed in detail in Korea Application No. 99-15332. The structure of the sync channels will be described first. Three sync channel structures are illustrated in FIGS. 16A to 17C.

Figure 16A:
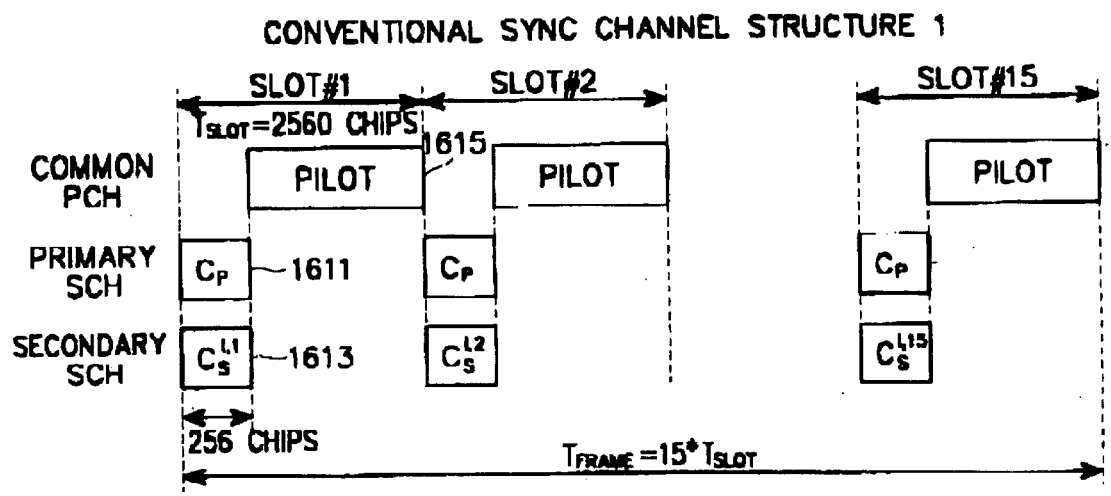
FIGS. 16A to 17C illustrate the structures of sync channels transmitted from a transmitting device.

FIG. 16A shows a sync channel structure for cell search in a W-CDMA system. Reference numeral 1611 denotes a P-SCH signal, reference numeral 1613 denotes an S-SCH, and reference numeral 1615 denotes a common pilot channel signal. One frame is comprised of 15 slots. The P-SCH and S-SCH are transmitted overlapped for an N1 chip length from the start of each slot because they are mutually orthogonal. The common pilot channel is spread with a different PN code having a period equal to the frame length.

A gold code with period $2^{18}-1$ is divided by the frame length and divided gold codes are used as different PN codes in the above W-CDMA system. M (=512) gold codes are used among total available gold codes. The common pilot channel is transmitted without overlap with either the P-SCH or S-SCH in each slot as shown in FIG. 16A.

Synchronization codes used for the sync channels are generated through modulo addition of a Hadamard sequence and a hierarchical sequence. A hierarchical sequence y is generated using sequences $x_1$ and $x_2$ of length $n_1$, and $n_2$, respectively:

$$y(i) = x_2(i \bmod n_2) + X_2(i \text{ div } n_1) \text{ for } i=0, \ldots, (n_1 \times n_2)-1$$

where $x_1$ and $x_2$ are of length 16.

$x_2 = <0,0,1,1,0,1,0,1,1,1,1,0,0,0,1>$
$x_1 = <0,0,1,1,1,1,0,1,0,0,1,0,0,0,1,0>$

By modulo addition of y(i) and a Hadamard sequence of length 256, the following sync code is generated.

$$\{c\_\{sc\_\}\} = <h_n(0)+y(0), h_n(1)+y(1), h_n(2)+y(2), \ldots, h_n(255)+y(255)>$$

For high speed Hadamard transformation, a primary synchronization code $C_p$ and secondary sync codes $\{C_1, \ldots, C_{17}\}$ are defined as $$c\_p = c\_\{sc\_0\}$$

$$c\_1 = c\_\{sc\_i\} \sim\sim\sim (i=1, \ldots, 17)$$

Synchronization code #0 $C_p$ is transmitted for a 1/10 of each slot, that is, for 256 chips. The same synchronization code is used in P-SCHs of all cells. The slot timing of a received signal is detected using the P-SCH. A comma free code is introduced to transmit the S-SCH from a transmitter. The comma free code includes 32 codewords, each codeword including 16 symbols. A codeword is transmitted repeatedly in every frame. The 16 symbols of the codeword are mapped to synchronization codes for transmission. As shown in FIG. 16A, an ith synchronization code corresponding to a symbol i is transmitted in each slot. The 32 codewords of the comma free code identify 32 base station groups. Since the comma free code is characterized in that a different codeword has a uniquely different cyclic shift value, information about a base station group and frame synchronization can be obtained from the S-SCH. Here, the frame synchronization indicates synchronization with timing or phase in one period of a PN spreading code in a spread spectrum system. One period of a spreading code and one frame are equally 10 ms in the current W-CDMA system. Thus, this is called frame synchronization.

Finally, the base station code of a base station in question is detected by calculating a correlation of the spreading code used in the base station. A forward common channel such as a pilot channel and a broadcasting channel can be used in the course of calculating the correlation. While pilot symbols are transmitted on a broadcasting channel in TDM (Time Division Multiplexing) in the W-CDMA system, CDM (Code Division Multiplexing) transmission of the pilot symbols is discussed in the recent standards harmonization study. In FIG. 16A, the forward common pilot channel is CDM-transmitted and stopped when a synchronization code is transmitted.

Figure 16B:
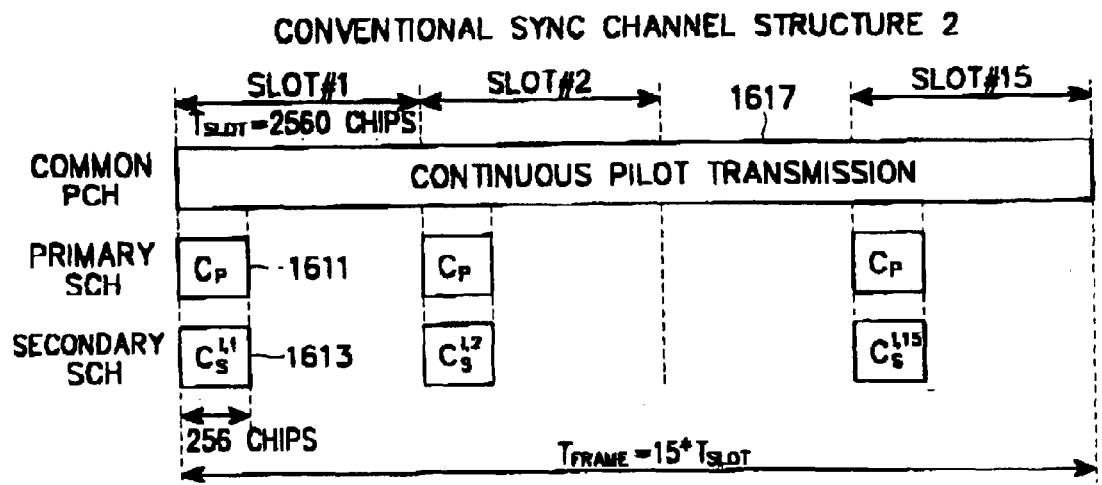

In FIG. 16B, a forward common pilot channel 1617 is CDM-transmitted continuously even when the sync channels are transmitted.

Pilot symbols and data can be TDM-transmitted on the common pilot channel (the current W-CDMA system), or data can be transmitted separately on an extra channel. In the latter case, the boundary of a data channel frame should be the same as that of a pilot channel frame.

Figure 17A:
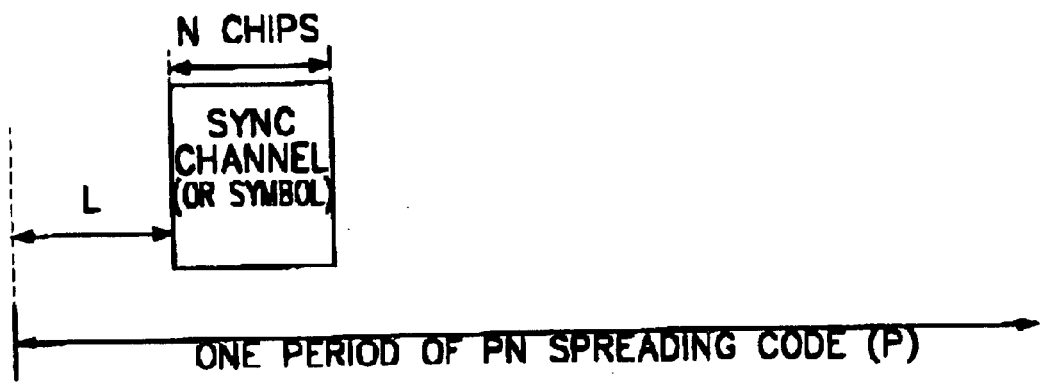
Figure 17B:
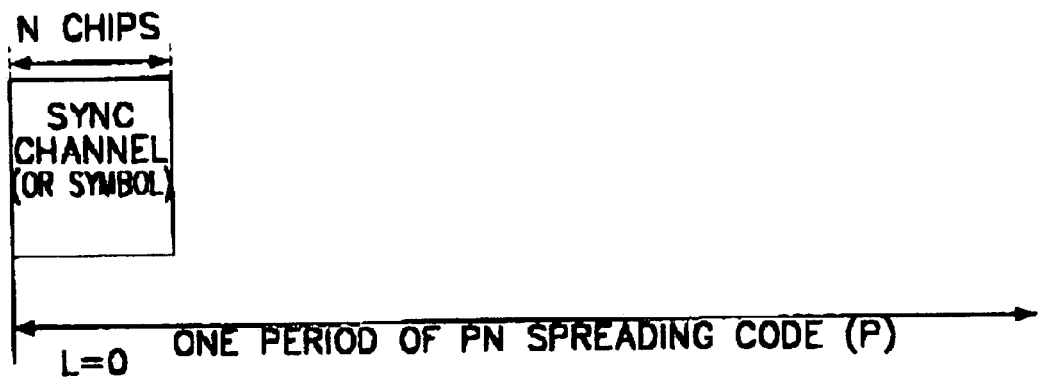
Figure 17C:
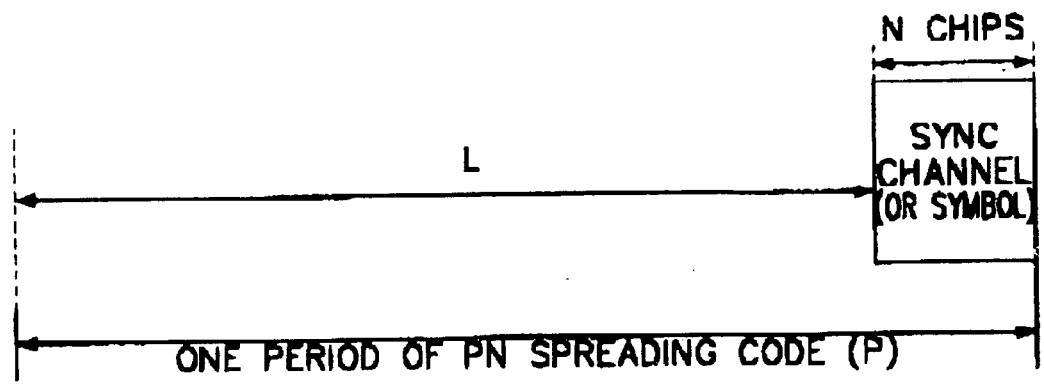

FIGS. 17A, 17B, and 17C are other concept views of sync channels for frame synchronization.

Referring to FIGS. 17A, 17B, and 17C, frame synchronization indicates acquisition of timing synchronization in one period of a spreading code in a spread spectrum system. A sync channel is inserted at a predetermined position in one period of the spreading code in the drawings. A receiver corresponding to a transmitter employing this channel structure first acquires sync channels and then achieves frame synchronization automatically upon completion of sync channel acquisition. Here, the frame synchronization indicates synchronization with timing or phase in one period of a PN spreading code in a spread spectrum system. One period of a spreading code and one frame are equally 10 ms in the current W-CDMA system. Thus, this is called frame synchronization. A conventional matching filter can be used to acquire the sync channels. As compared to synchronization in the current W-CDMA system, frame synchronization can be acquired using one sync channel less frequently just in one step.

FIG. 17A illustrates a sync channel transmitted at a predetermined position in one period P of a spreading code in a spread spectrum system. The predetermined position is apart from the starting point of the period P (i.e., initial state) by a predetermined distance L chips. L is predetermined between a transmitter and a receiver. The sync channel is N chips in duration, 256 chips in an embodiment of the present invention. The receiver acquires the sync channel using a matching filter. Upon completed sync channel acquisition, the receiver automatically acquires synchronization with the timing of the PN spreading code. That is, it is found that the period of the spreading code starts L chips before the acquired sync channel.

In FIG. 17B, the sync channel is transmitted with L=0. That is, the starting point of the sync channel is the same as that of the period of the spreading code. FIG. 17C illustrates the case that the ending point of the sync channel is the same as the starting point of the period of the spreading code with L=P−N.

If only one PN code is used as a spreading code, acquisition of a sync channel is equivalent to acquisition of the spreading code. If a plurality of PN codes are used as spreading codes, the spreading codes are acquired in two steps. The receiver first acquires the sync channel. Then, a mobile station obtains information about the phases (timings) of the spreading codes though it does not know which spreading code was used. Then, the receiver calculates the correlation of each spreading code through despreading based on the timing information and detects the spreading code used by obtaining a maximum of the correlations, comparing the correlations with thresholds, or combining them. Thus, the receiver acquires the final synchronization.

While FIGS. 17A, 17B, and 17C show a sync channel inserted once per period of a spreading code, it can be further contemplated that the sync channel is inserted once over a plurality of periods or several times in one period to acquire the timing of the spreading code.

Figure 18:
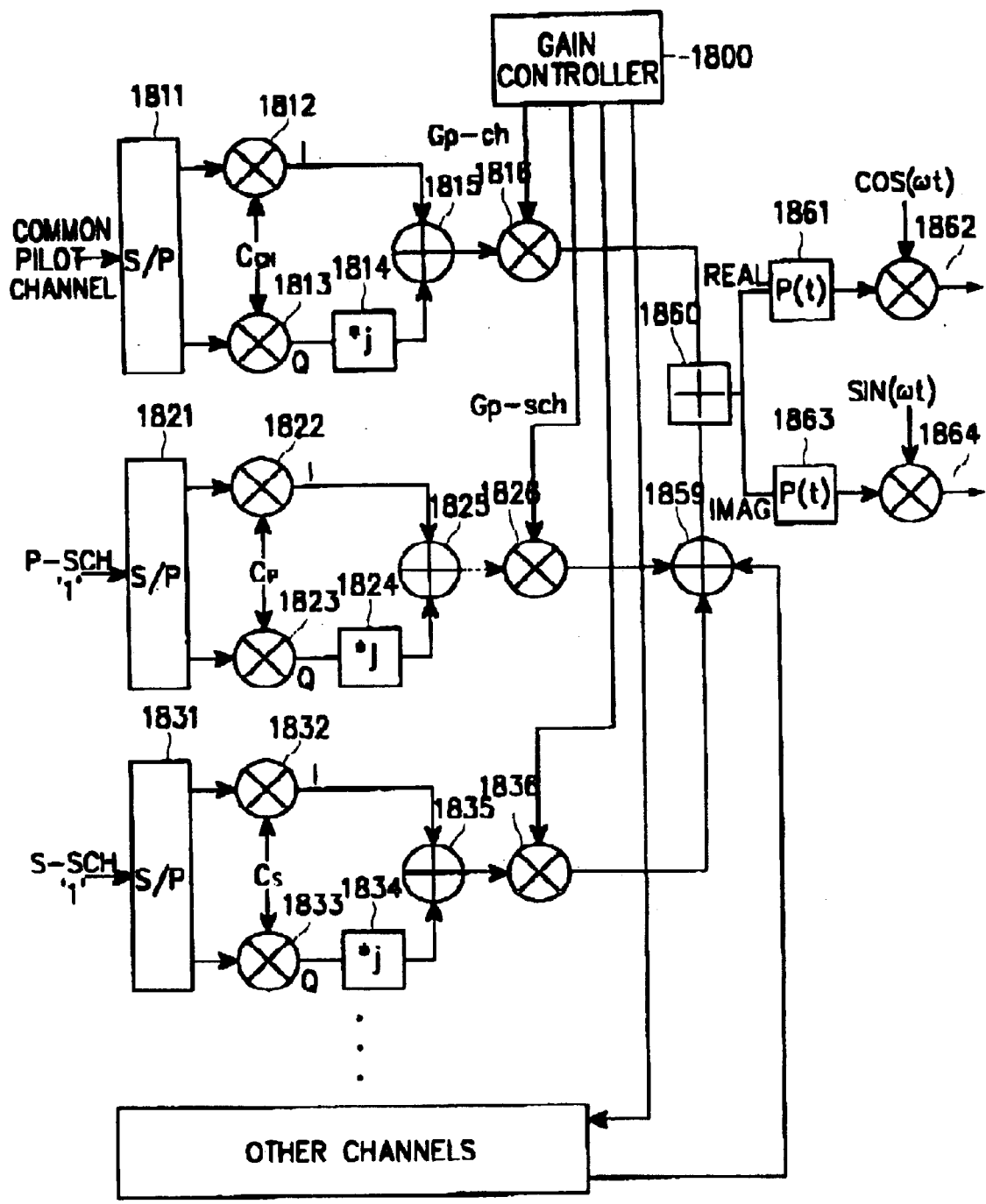
FIG. 18 illustrates an exemplary sync channel structure for transmitting sync channel information from the transmitting device.

FIG. 18 is a block diagram of a transmitting device for transmitting sync channel signals of the structures shown in FIGS. 16A to 17C.

Referring to FIG. 18, a serial-to-parallel converter (SPC) 1811 converts a received common pilot channel signal to parallel I and Q channel data. Multipliers 1812 and 1813 spread the I and Q channel common pilot data with a channel spreading code $C_{CH}$. All channel spreading codes used in FIG. 18 can be expressed in complex numbers. A phase shifter 1814 transits the phase of the Q channel spread data by 90°. An adder 1815 generates a complex spread add signal i+jQ by adding the outputs of the multiplier 1812 and the phase shifter 1814.

An SPC 1821 converts a received P-SCH to parallel I and Q channel data. Multipliers 1822 and 1823 spread the I and Q channel P-SCH data with a channel spreading code Cp. A phase shifter 1824 transits the phase of the Q channel spread data by 90°. An adder 1825 generates a complex spread add signal i+jQ by adding the outputs of the multiplier 1822 and the phase shifter 1824.

An SPC 1831 converts a received S-SCH to parallel I and Q channel data. Multipliers 1832 and 1833 spread the I and Q channel S-SCH data with a channel spreading code $C_s$. A phase shifter 1834 transits the phase of the Q channel spread data by 90°. An adder 1835 generates a complex spread add signal i+jQ by adding the outputs of the multiplier 1832 and the phase shifter 1834.

The above channel transmitting device may further have other common channels or dedicated channels besides the common pilot channel, the P-SCH, and the S-SCH. If this is the case, additional forward common channel transmitters and forward dedicated channel transmitters would be provided.

A gain controller 1800 generates a gain control signal for controlling the transmission power of each channel signal and determining whether to transmit the channel signal. Especially when a base station operates in a synchronous mode, the gain of the S-SCH is set to 0 so as not to transmit the S-SCH as embodied in one embodiment of the present invention. How often the P-SCH is transmitted at and what power level can also be controlled by the gain controller 1800. Consequently, the transmission structure suggested in the present invention is applicable to a base station regardless of a synchronous mode or an asynchronous mode.

In a synchronous mode, the gain controller 1800 outputs 0 as a gain control signal Gs-sch and then a gain adjuster 1836 outputs 0 as the S-SCH signal. The gain controller 1800 outputs a gain control signal Gp-sch with higher power in the synchronous mode than in an asynchronous mode for a predetermined period of a frame and outputs 0 as the gain control signal Gp-sch. Then, a gain adjuster 1826 outputs the P-SCH having 1 or a higher value with an adjusted gain. In other words, the P-SCH signal is output with its normal transmission power or an increased power level. The gain controller 1800 generates a gain control signal Gp-ch for a pilot channel. The gain control signal Gp-ch may be 0 while the gain control signal Gp-sch for the P-SCH is generated.

An adder 1860 sums gain-adjusted channel signals received from the gain adjusters 1816, 1826, and 1836. Baseband filters 1861 and 1871 filter a baseband signal from the sum received from the adder 1860. Multipliers 1862 and 1864 multiply the outputs of the baseband filters 1861 and 1863 by their corresponding carriers.

Figure 19:
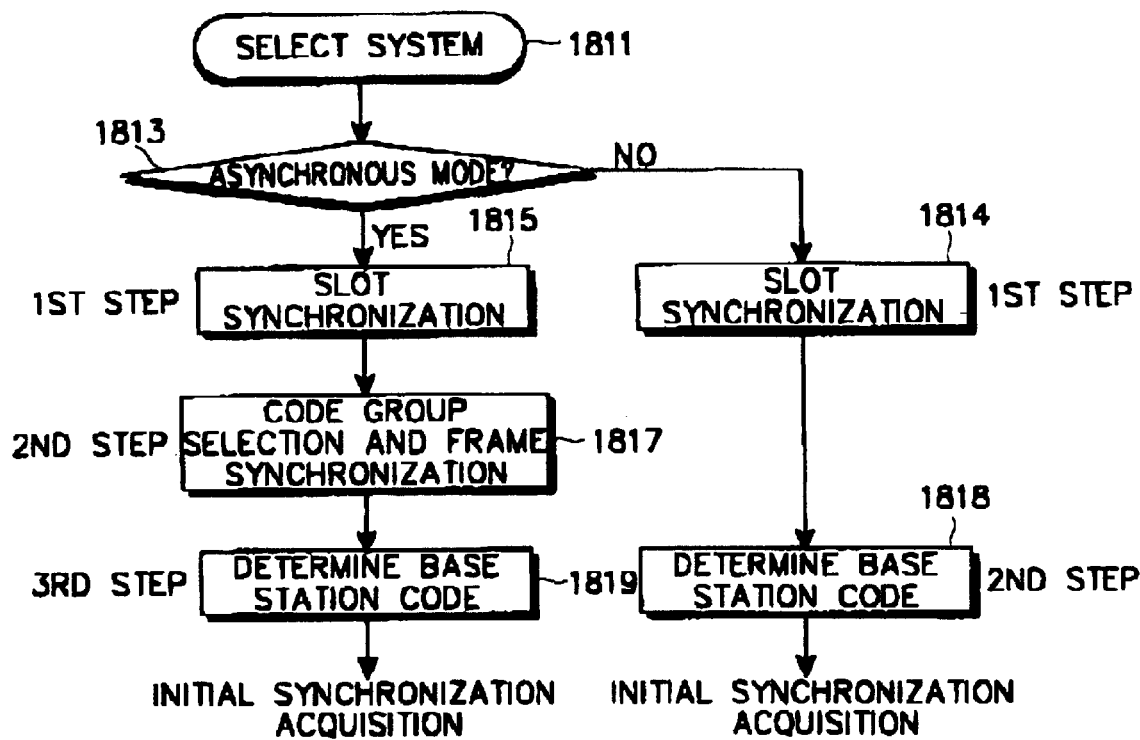
FIG. 19 is a flowchart illustrating a synchronization acquisition procedure according to sync channel structures.

FIG. 19 is a flowchart illustrating acquisition of synchronization from sync channel signals of the structures shown in FIGS. 16A to 17C which are received from the transmitting device shown in FIG. 18. The operation of a receiving device (e.g., mobile station) according to the operation mode a transmitting device (e.g., base station), that is, a synchronous or asynchronous mode is illustratively described in FIG. 19.

Referring to FIG. 19, the mobile station determines in what mode its serving base station is operating. The mobile station determines whether to acquire a synchronous mode or an asynchronous mode in step 1818 through system selection in step 1811. If the mobile station selects the asynchronous mode in step 1818, it performs a conventional three-step initial cell search process. The mobile station acquires slot synchronization in step 1815, selects a code group and synchronizes frames in step 1817, and determines a base station code in the code group in step 1819. Alternatively, if the mobile station selects the synchronous mode in step 1818, it acquires frame synchronization in step 1814 and determines a base station code in step 1818.

Figure 20A:
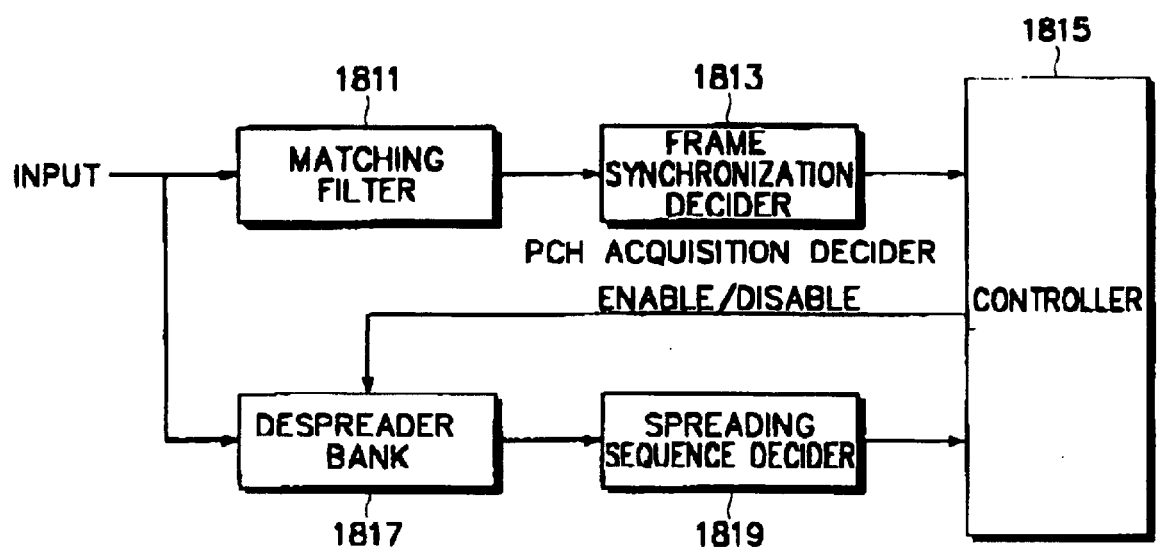
FIGS. 20A, 20B, and 20C are embodiments of a sync acquirer shown in FIG. 10.
Figure 20B:
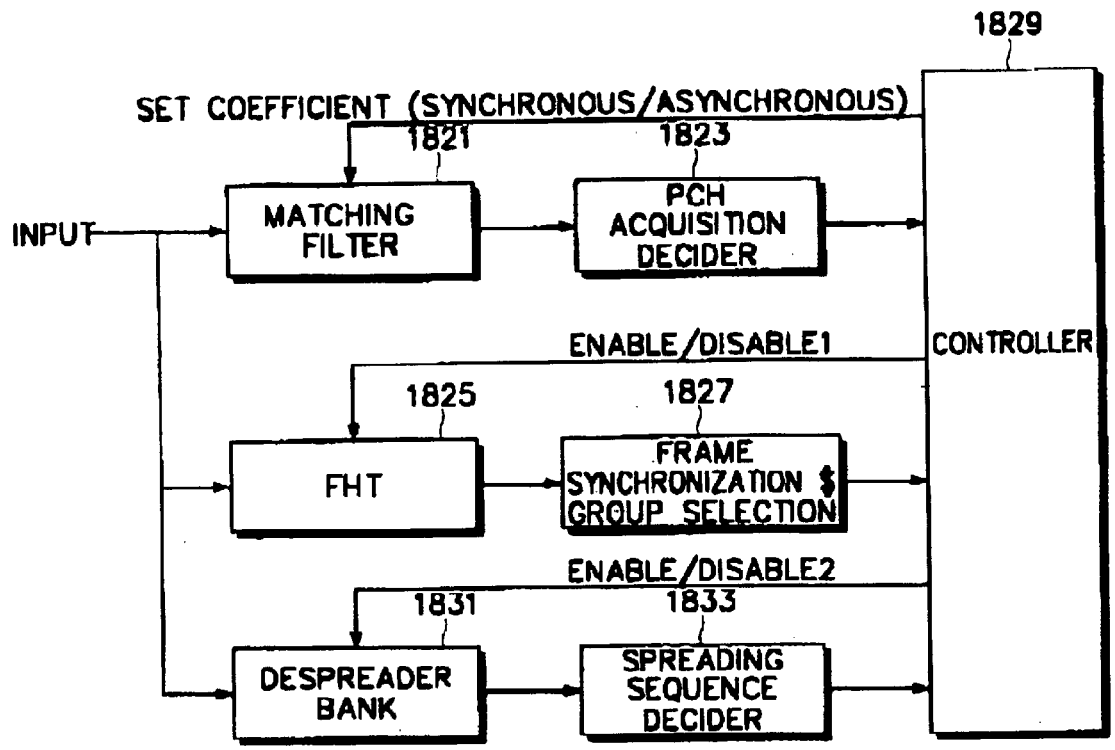
Figure 20C:
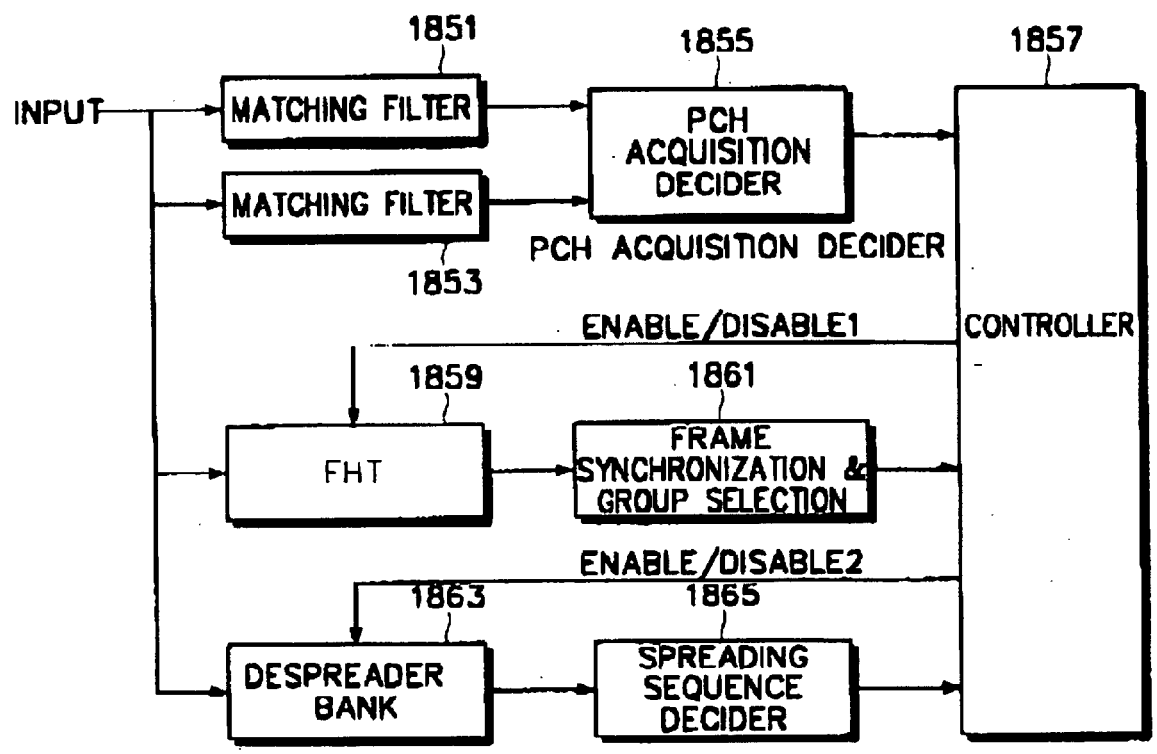

FIGS. 20A, 20B, and 20C are block diagrams of embodiments of the sync acquirer 1013 for acquiring frame synchronization from a received sync channel signal in a receiver.

In one embodiment of the sync acquirer 1013 shown in FIG. 17A, the mobile station receiver acquires frame synchronization using one sync channel. Referring to FIG. 20A, the receiver attempts to acquire the sync channel through a matching filter 1811. A frame synchronization decider 1813 determines whether the sync channel has been acquired from the attempt result received from the matching filter 1811. The frame synchronization decider 1813 is a P-SCH acquisition decider. Upon receipt of the decision result and frame synchronization information from the frame synchronization decider 1813, a controller 1815 controls the operation of a despreader bank 1817 based on the received information. The despreader bank 1817 includes at least one despreader for parallel despreading. The despreader bank 1817 operates in the same manner as the despreader 1011 of FIG. 10. The despreader bank 1817 despreads an input signal with available spreading sequences and a spreading sequence decider 1819 determines what spreading sequence was used as a spreading code from the despread signals received from the despread bank 1817 and verifies synchronization acquisition. The result is fed to the controller 1815, notifying whether the final synchronization has been successful.

FIG. 20B illustrates the structure of the sync acquirer 1013 operated in a synchronous or asynchronous mode according to mode selection of a controller in a mobile station.

A controller 1829 selects an operation mode between a synchronous mode and an asynchronous mode. If the asynchronous mode is selected, coefficients of a matching filter 1821 are set to values for the asynchronous mode. Then, the three-step cell search shown in FIG. 19 is performed. If the synchronous mode is selected, the receiver of the mobile station attempts to acquire a sync channel using the matching filter 1821. A P-SCH acquisition decider 1823 determines whether the P-SCH has been acquired from the attempt result received from the matching filter 1821. Upon receipt of the decision result and frame synchronization information from the P-SCH acquisition decider 1823, the controller 1829 controls the operation of a despreader bank 1831 based on the received information. The despreader bank 1831 despreads an input signal with available spreading sequences. A spreading sequence decider 1833 determines what spreading sequence was used as a spreading code from the despread signals received from the despread bank 1831 and verifies synchronization acquisition. The result is fed to the controller 1829, notifying whether the final synchronization has been successful.

FIG. 20C illustrates a third embodiment of the sync acquirer 1013 in which instead of selecting a synchronous mode or an asynchronous mode by a controller 1857, correlations of an input signal are calculated with respect to a primary synchronization code in a synchronous mode and to the primary synchronization code in an asynchronous mode through two matching filters 1851 and 1853 and the system operation mode is determined from these correlations. The first matching filter 1851 is configured to calculate the coefficient and correlation of the primary synchronization code in the synchronous mode. The second matching filter 1853 is configured to calculate the coefficient and correlation of the primary synchronization code in the asynchronous mode. A P-SCH acquisition decider 1855 receives the correlations from the matching filters 1851 and 1853 and determines the system operation mode. In the asynchronous mode the P-SCH acquisition decider 1855 further verifies slot synchronization. In the synchronous mode, the P-SCH acquisition decider 1855 further verifies frame synchronization. If the system operates in the asynchronous mode, the controller 1857 proceeds with a final acquisition process through the conventional three-step cell search. If the system operation mode is the synchronous mode, the controller 1857 controls the operation of a despreader bank 1863 based on information about frame synchronization. The despreader bank 1863 despreads an input signal with available spreading sequences and a spreading sequence decider 1865 determines what spreading sequence was used as a spreading code from the despread signals received from the despread bank 1863 and verifies synchronization acquisition. The result is fed to the controller 1857, notifying whether the final synchronization has been successful.

Now, verification of a sync word received from the transmitting device shown in FIG. 9 in a receiving device will be described referring to FIG. 10. In FIG. 10, the despreader 1011 despreads received channel signals based on synchronization information received from the sync acquirer 1013. The controller 1015 generates a control signal for separating and selecting pilot and other data from a corresponding channel among slot signals in the formats shown in FIGS. 2A to 2D. A demultiplexer 1017 demultiplexes pilot and other data of a corresponding channel among pilot signals of sync bit patterns shown in FIGS. 3A to 3H in a despread slot in response to the select signal received from the controller 1015. Here, the demultiplexer 1017 reversely performs the operation of the second selector 916 shown in FIG. 9. A sync word extractor 1019 extracts sync bits from a pilot in each slot. That is, the sync word extractor 1019 extracts the sync bits marked black among pilot bits shown in FIGS. 3A to 3H. The sync word extractor 1019 performs the reverse operation of the first selector 913 shown in FIG. 9. The operation of the sync word extractor 1019 may be performed under the control of the controller 1015.

Figure 15:
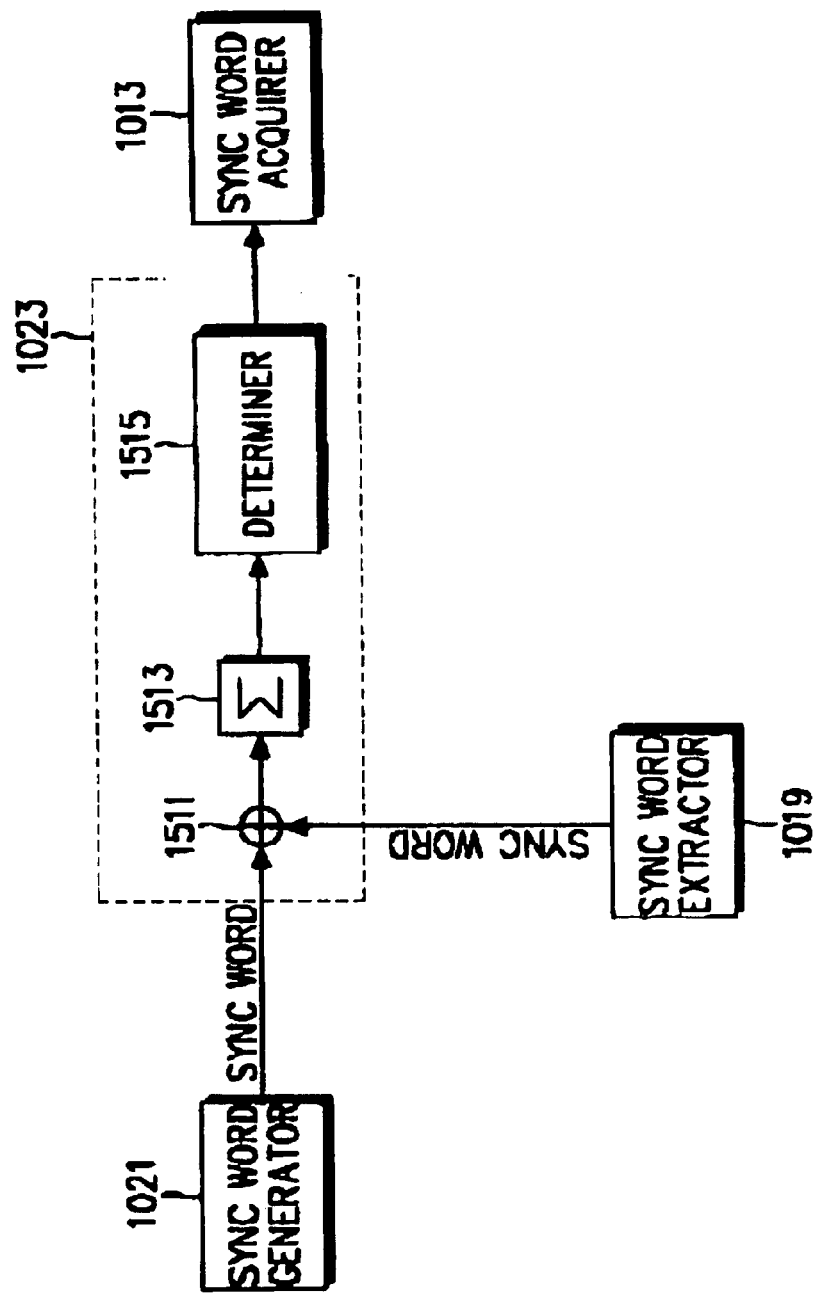
FIG. 15 is a block diagram of a frame synchronization verifier in the receiving device shown in FIG. 10.

A frame synchronization verifier 1023 receives the sync bits from the sync word extractor 1019 and a sync word from a sync word generator 1021 and verifies frame synchronization. FIG. 15 is a block diagram of the frame synchronization verifier 1023.

Referring to FIG. 15, the frame synchronization verifier 1023 receives the sync word from the sync word extractor 1019 and an autonomously generated sync word from the sync word generator 1021 and generates a frame synchronization verification signal. An adder 1511 adds the two sync words bit to bit. An accumulator 1513 accumulates the add signal on a frame basis and calculates the correlation of the two sync words. A determiner 1515 determines whether frame synchronization has been acquired from the correlation received from the accumulator 1513. The determiner 1515 compares a predetermined threshold with the output of the accumulator 1513 in order to verify frame synchronization, as shown in the example in FIG. 15. That is, if the received correlation is the threshold or higher, the determiner 1515 determines that frame synchronization has been acquired. Otherwise, it determines if frames are not in synchronization. In the latter case, the synchronization acquirer 1013 acquires frame synchronization in response to the notification of the determiner 1515.

The sync word generator 911 of FIG. 9 (transmitter part) and the sync word generator 1021 of FIG. 10 (receiver part) may generate sync words using m-sequences. If one frame includes 15 slots or $2^P-1$ slots, the length of the m-sequences is equal to the number of slots and the number of the m-sequences is equal to the number N of sync bits in one slot. The sync word generators 911 and 1021 can be configured as shown in FIGS. 11, 12, and 13.

Figure 11:
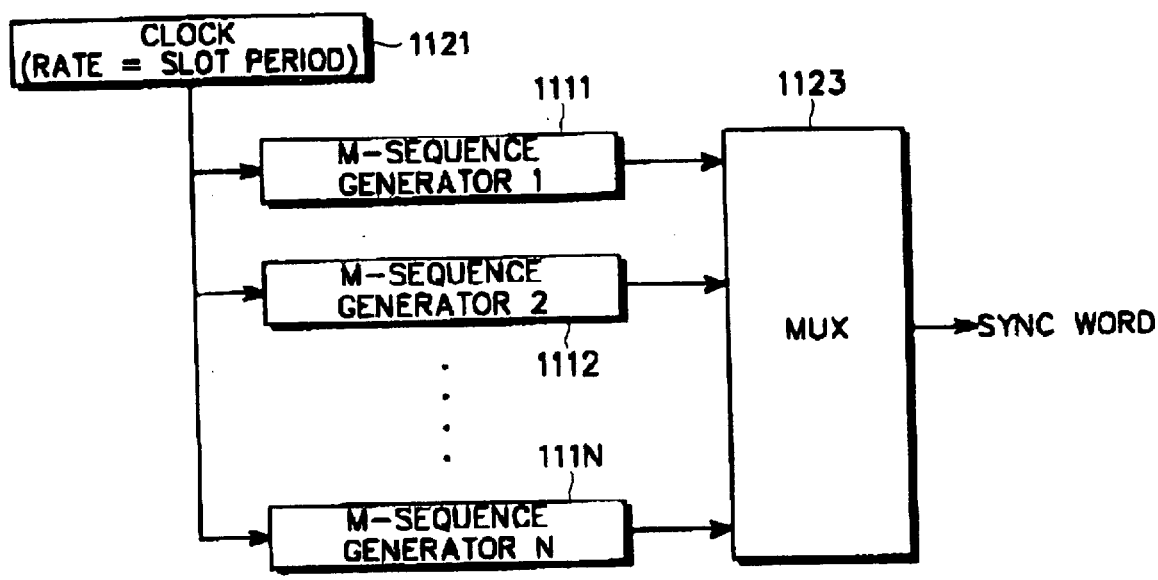
FIG. 11 illustrates an embodiment of a sync word generator in the receiving device shown in FIG. 10.

FIG. 11 is a block diagram of an embodiment of a sync word generator.

Referring to FIG. 11, N (the number of bits in one slot) m-sequence generators 1111 to 111N each output one bit synchronously in each slot according to a clock signal received from a clock generator 1121. A selector 1123 multiplexes the sync bits received from the m-sequence generators 1111 to 111N. That is, the sync bits of the m-sequence generators 1111 to 111N are sequentially output as a sync symbol of N bits. Assuming that one frame has 15 slots, each m-sequence generator outputs an m-sequence of period 15. Therefore, the period of the entire sync word sequence is 15 slots (i.e. one frame) and 15×N sync bits are output for the period. Consequently, a sync word is output in a pattern shown in FIG. 5. In FIG. 11, the m-sequence generators 1111 to 111N can generate different m-sequences or part of m-sequence generators generate shifted m-sequence of the other m-sequences.

Figure 12:
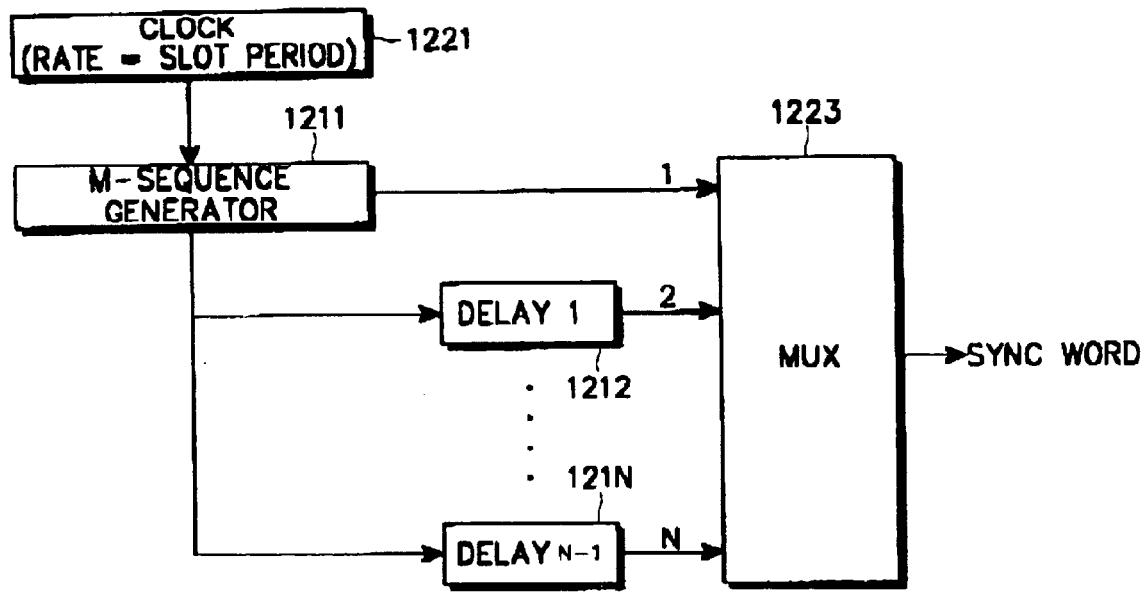
FIG. 12 illustrates another embodiment of the sync word generator in the receiving device shown in FIG. 10.

FIG. 12 is a block diagram of another embodiment of the sync word generator.

Referring to FIG. 12, the sync word generator includes an m-sequence generator 1211 for generating an m-sequence, delays 1212 to 121N for delaying the m-sequence by predetermined time delay values respectably, and a selector 1223 for multiplexing N–1 m-sequences received from the delays 1212 to 121N. Here, the m-sequence generator 1211 and the delays 1212 to 121N each generate an m-sequence one bit per slot according to a clock signal of a slot period and delay the m-sequence. That is, an N-bit sync symbol is generated directly from the m-sequence generator 1211 and respectably delayed m-sequences are generated from the delays 1212 to 121N. While the embodiment shown in FIG. 12 depicts the m-sequence of the m-sequence generator 1211 as simultaneously inputting into each delay 1212–121N, it can be further contemplated that the output of the delay 1212 is concurrently fed to the selector 1223 and the delay 1213 (not shown) and the output of the delay 1213 is concurrently fed to the selector 1223 and the delay 1214 (not shown). The m-sequence generator 1211 may generate an m-sequence of period 15. Therefore, the period of the entire sync word sequence is 15 slots, that is, 15×N sync bits are output for the one frame period. The delays 1212 to 121N have 1 to 15 clock pulses as their delay values and output different m-sequences. It is to be noted that delayed sequences are also all m-sequences due to the nature of the m-sequence.

Figure 13:
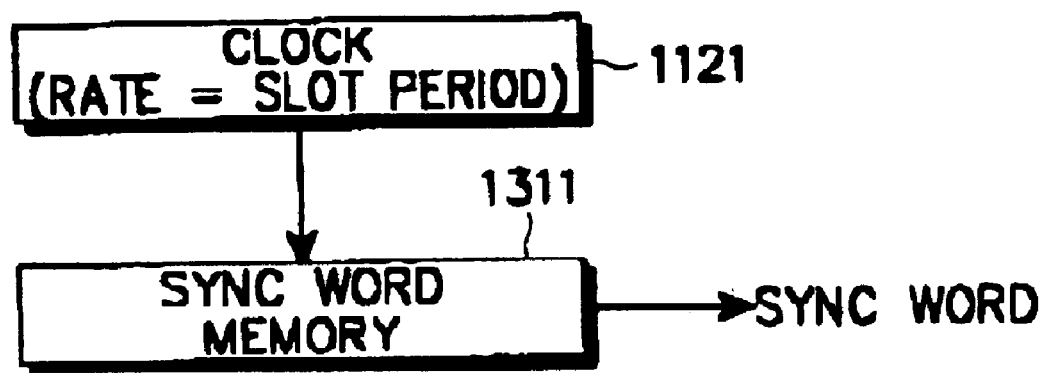
FIG. 13 illustrates a third embodiment of the sync word generator in the receiving device shown in FIG. 10.

FIG. 13 is a block diagram of a third embodiment of the sync word generator.

Referring to FIG. 13, an m-sequence is externally generated and stored in a sync word memory 1311. The same sync word as those generated in FIGS. 11 and 12 is generated in the pattern shown in FIG. 5. This method is applicable when a storage device has extra capacity.

Figure 14:
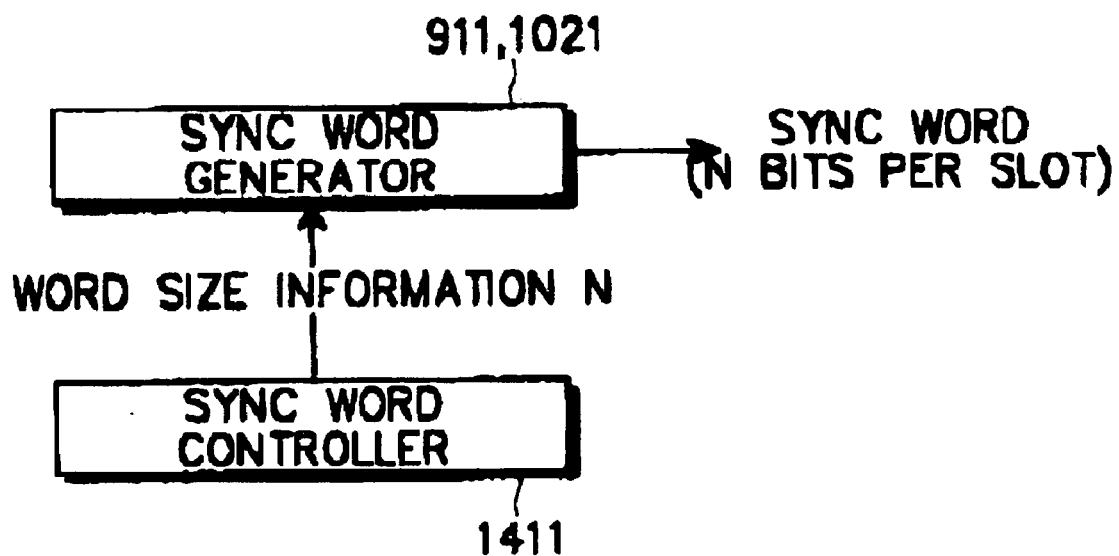
FIG. 14 illustrates input of the sync word generators shown in FIGS. 11, 12, and 13.

FIG. 14 illustrates a device for applying information about the length of a sync word to the sync word generators 911 and 1021 of a structure shown in FIG. 11, 12, or 13. In FIG. 14, the input portion of the sync word generator is common regardless of the structures shown in FIGS. 11, 12, and 13 and not shown in the other drawings. The sync word generators 911 and 1021 receive information (e.g., N) about sync word size from a sync word controller 1411 and output sync words (e.g., N bits in one slot and 15N bits in one frame) according to the received information.

The above synchronization acquisition procedure ends after one synchronization verification is accomplished as shown in FIG. 21A or is repeatedly performed in every predetermined period as shown in FIG. 21B.

Referring to FIG. 21A, upon synchronization acquisition in step 2111, the correlation of a sync word is calculated, thereby verifying the acquired frame synchronization in step 2113. If the correlation is larger than a threshold in step 2115, the frame synchronization verification is terminated and frame demodulation and decoding is repeatedly performed. Otherwise, the procedure returns to step 2111.

Referring to FIG. 21B, upon synchronization acquisition in step 2121, the correlation of a sync word is calculated, thereby verifying the acquired frame synchronization in step 2123. If the correlation is larger than a threshold in step 2125, the frame synchronization verification is terminated, frame demodulation and decoding is repeatedly performed, and then the procedure goes back to step 2123 to verify frame synchronization in the next period. Otherwise, the procedure returns to step 2111.

In accordance with the embodiment of the present invention as described above, a sync word generated shows the correlation characteristic shown in FIG. 8 due to the nature of m-sequences. If frames are in synchronization, that is, an offset is 0 or a multiple of 15, the auto-correlation of the sync word is 15×N and if frames are not in synchronization, the auto-correlation is −N. Therefore, frame synchronization can be verified with high reliability by the use of a sync word generated in the method.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An apparatus for generating a sync word for synchronization of frames each having a predetermined number of slots in a CDMA communication system, comprising:
   at least two m-sequence generators each for generating a predetermined number of sequential elements; and
   a selector for multiplexing the sequential elements received from the m-sequence generators and assigning the multiplexed sequential elements in the slots;
   wherein the sync word comprises ($2^P-1$) sync symbols in a frame, each sync symbol comprises N sync buts in a slot, the sync word having a period of ($2^P-1$)×N, and P and N are positive integers.

2. The apparatus of claim 1, wherein a frame is 10 ms in duration and has 15 slots.

3. The apparatus of claim 2, wherein the m-sequence generators generate different m-sequences.

4. The apparatus of claim 3, further comprising a plurality of delays for generating other different m-sequences by delaying the m-sequences received from the m-sequence generators.

5. The apparatus of claim 3, wherein the number of m-sequences generated by the m-sequence generators is equal to the number of sync bits in the slots.

6. The apparatus of claim 4, wherein the number of m-sequences generated by the m-sequence generators is equal to the number of sync bits in the slots.

7. A method of generating a sync word for synchronization of frames each having a predetermined number of slots in a CDMA communication system, comprising the steps of:
   generating a predetermined number of sequential elements from at least two m-sequence generators; and
   multiplexing the sequential elements and assigning the multiplexed sequential elements in the slots by a selector;
   wherein the sync word comprises ($2^P-1$) sync symbols in a frame, each sync symbol comprises N sync buts in a slot, the sync word having a period of ($2^P-1$)×N, and P and N are positive integers.

8. The method of claim 7, wherein a frame is 10 ms in duration and has 15 slots.

9. The method of claim 8, wherein the m-sequences generators generate different m-sequences.

10. The method of claim 9, further comprising the step of generating other different m-sequences by delaying the m-sequences received from the m-sequence generators in a plurality of delays.

11. The method of claim 9, wherein the number of m-sequences generated by the m-sequence generators is equal to the number of sync bits in the slots.

12. The method of claim 10, wherein the number of m-sequences generated by the m-sequence generators is equal to the number of sync bits in the slots.

13. An apparatus for generating a frame sync word including a first sync symbol and a second sync symbol in the slots of a frame for frame synchronization in a CDMA communication system, comprising:
   a first m-sequence generator for generating as many first sequential elements as the slots in the frame and outputting the first sequential elements as the first sync symbol sequence;
   a second m-sequence generator for generating as many second sequential elements different from the first sequential elements as the slots in the frame and outputting the second sequential elements as the second sync symbol sequence; and
   a selector for multiplexing the first and second sync symbols received from the first and second m-sequence generators and assigning the multiplexed symbols in corresponding slots;
   wherein the sync word comprises ($2^P-1$) sync symbols in a frame, each sync symbol comprises N sync buts in a slot, the sync word having a period of ($2^P-1$)×N, and P and N are positive integers.

14. An apparatus for generating a frame sync word including a first sync symbol and a second sync symbol in the slots of a frame for frame synchronization in a CDMA communication system, comprising:
   a first m-sequence generator for generating first sequential elements as many as the slots in the frame and outputting the first sequential elements as the first sync symbol sequence;

a second m-sequence generator for generating shifted first sequential elements and outputting the shifted first sequential elements as the second sync symbol sequence; and a selector for multiplexing the first and second sync symbols received from the first m-sequence generator and the second m-sequence generator and assigning the multiplexed symbols in corresponding slots;

wherein the sync word comprises $(2^P-1)$ sync symbols in a frame, each sync symbol comprises N sync buts in a slot, the sync word having a period of $(2^P-1) \times N$, and P and N are positive integers.

15. An apparatus for generating a frame sync word including first to fourth sync symbols in the slots of a frame for frame synchronization in an CDMA communication system, comprising:

first to fourth m-sequence generators for generating different sequential elements and outputting the sequential elements as the first to fourth sync symbols, each sync symbol having as many sequential elements as the slots in the frame; and a selector for multiplexing the first to fourth sync symbols received from the first to fourth m-sequence generators and assigning the multiplexed symbols in corresponding slots;

wherein the sync word comprises $(2^P-1)$ sync symbols in a frame, each sync symbol comprises N sync buts in a slot, the sync word having a period of $(2^P-1) \times N$, and P and N are positive integers.

16. An apparatus for generating a frame sync word including first to fourth sync symbols in the slots of a frame for frame synchronization in an CDMA communication system, comprising:

first and second m-sequence generators for generating different sequential elements and outputting the sequential elements as the first and second sync symbols, each sync symbol having as many sequential elements as the slots in the frame;

first and second delays for delaying the first and second sync symbols by one slot and outputting the delayed sync symbols as the third and fourth sync symbols, respectively; and a selector for multiplexing the first to fourth sync symbols received from the first to fourth m-sequence generators and assigning the multiplexed first to fourth sync symbols in corresponding slots;

wherein the sync word comprises $(2^P-1)$ sync symbols in a frame, each sync symbol comprises N sync buts in a slot, the sync word having a period of $(2^P-1) \times N$, and P and N are positive integers.

17. An apparatus for generating a frame sync word including first to fourth sync symbols in the slots of a frame for frame synchronization in an CDMA communication system, comprising:

an m-sequence generator for generating as many sequential elements as the slots in the frame and outputting the sequential elements as the first sync symbol;

first, second, and third delays for delaying the first sync symbol by a predetermined value, respectively, and outputting the delayed sync symbols as the second to fourth sync symbols, respectively; and a selector for multiplexing the first to fourth sync symbols received from the first m-sequence generator and the first, second and third delays and assigning the multiplexed first to fourth sync symbols in corresponding slots;

wherein the sync word comprises $(2^P-1)$ sync symbols in a frame, each sync symbol comprises N sync buts in a slot, the sync word having a period of $(2^P-1) \times N$, and P and N are positive integers.

18. An apparatus for generating a frame sync word including first to eighth sync symbols in the slots of a frame for frame synchronization in an asynchronous CDMA communication system, comprising:

first to fourth m-sequence generators for generating different sequential elements and outputting the sequential elements as the first to fourth sync symbols, each sync symbol having as many sequential elements as the slots in the frame;

fifth to eighth m-sequence generators for generating shifted first to fourth sequential elements, respectively, as the fifth to eighth sync symbols each sync symbol having as many sequential elements as the slots in the frame; and a selector for multiplexing the first to eighth sync symbols received from the first to eighth m-sequence generators and assigning the multiplexed first to eighth sync symbols in corresponding slots;

wherein the sync word comprises $(2^P-1)$ sync symbols in a frame, each sync symbol comprises N sync buts in a slot, the sync word having a period of $(2^P-1) \times N$, and P and N are positive integers.

19. A frame synchronization verifying apparatus in an CDMA communication system in which one frame has a plurality of slots, each slot has a plurality of bits, and each frame has a sync word, comprising:

at least two m-sequence generators each for generating as many sequential elements as the slots of the frame;

a sync word generator for multiplexing the sequential elements received from the m-sequence generators, assigning the multiplexed sync symbols in corresponding slots, and outputting a frame sync word;

a despreader for despreading slot data of a sync word received from a base station device;

a sync word extractor for extracting the sync symbols from the despread slots; and a frame synchronization verifier for verifying frame synchronization by comparing the generated sync symbols with the extracted sync symbols;

wherein the sync word comprises $(2^P-1)$ sync symbols in a frame, each sync symbol comprises N sync buts in a slot, the sync word having a period of $(2^P-1) \times N$, and P and N are positive integers.

* * * * *